United States Patent [19]

Iwasaki et al.

[11] Patent Number: 5,867,656
[45] Date of Patent: *Feb. 2, 1999

[54] METHOD FOR INTERPROCESSOR COMMUNICATION

[75] Inventors: Masaaki Iwasaki, Tachikawa; Hiroyuki Chiba, Kawasaki; Naoki Utsunomiya, Tokyo; Kouji Sonoda, Kokubunji; Satoshi Yoshizawa, Kawasaki; Masahiko Yamauchi, Kokubunji, all of Japan

[73] Assignee: Hitachi, Ltd., Tokyo, Japan

[ * ] Notice: The term of this patent shall not extend beyond the expiration date of Pat. No. 5,659,777.

[21] Appl. No.: 759,890

[22] Filed: Dec. 3, 1996

Related U.S. Application Data

[63] Continuation of Ser. No. 126,088, Sep. 23, 1993, Pat. No. 5,659,777.

[30] Foreign Application Priority Data

Sep. 25, 1992 [JP] Japan .................................. 4-256155

[51] Int. Cl.⁶ .............................. G06F 13/38; G06F 15/17
[52] U.S. Cl. ................................ 395/200.45; 395/200.75; 395/200.31
[58] Field of Search ................. 395/200.56, 200.46, 395/200.43, 200.42, 200.75, 200.45, 200.31, 841, 182.03, 310, 800.29; 711/173

[56] References Cited

U.S. PATENT DOCUMENTS

| | | | |
|---|---|---|---|
| 4,654,654 | 3/1987 | Butler et al. ........................ | 340/825.5 |
| 4,777,595 | 10/1988 | Strecker et al. ........................ | 395/200 |
| 4,803,655 | 2/1989 | Flora ....................................... | 395/375 |
| 4,827,403 | 5/1989 | Steele, Jr. et al. ...................... | 395/800 |
| 5,010,477 | 4/1991 | Omoda et al. .......................... | 364/200 |
| 5,140,583 | 8/1992 | May et al. . | |
| 5,239,643 | 8/1993 | Blont ...................................... | 395/425 |
| 5,297,255 | 3/1994 | Hamanaka et al. .................... | 395/200 |
| 5,303,363 | 4/1994 | Berarducci ............................. | 395/425 |
| 5,659,777 | 8/1997 | Iwasaki et al. ......................... | 395/200.56 |

FOREIGN PATENT DOCUMENTS

| | | |
|---|---|---|
| 0029331 | 5/1981 | European Pat. Off. . |
| 0411497A2 | 2/1991 | European Pat. Off. . |
| 1-194055 | 8/1989 | Japan . |
| 1-194056 | 8/1989 | Japan . |
| 4-40551 | 2/1992 | Japan . |
| 4-291660 | 10/1992 | Japan . |
| 2101358 | 1/1983 | United Kingdom . |

OTHER PUBLICATIONS von Eicken et al. "Active Messages: A Mechanism for Integrated Communication and Computation," Proc. of Int. Symp. on Comp. Arch., 1992, pp. 256–266.

Comer et al., "Internetworking with TCP/IP vol. 2", pp. 14–36; 103–121., 1994.

*Primary Examiner*—Mark H. Rinehart
*Attorney, Agent, or Firm*—Fay Sharpe Beall Fagan Minnich & McKee

[57] ABSTRACT

In a computer system in which nodes are connected to each other via a network, transmission and reception buffers of sender and receiver processes are prepared as resident areas in a main storage. A node of a receiver side notifies, prior to initiation of a communication, a physical address of a data reception area of the node to a node on a sender side. In the node on the sender side, the reported physical address is added to transmission data to transfer a resultant item. On the receiver side, reception data is written in a location of the main storage at the physical address. In the receiver node, the double buffering is employed to prevent an overwriting operation of another node onto the data reception area. The respective nodes achieve partial synchronization with adjacent nodes in chain, thereby automatically establishing synchronization between all nodes. A node on a receiver side notifies prior to initiation of a communication an identifier of a data reception area to a node on a sender side such that the sender node transmits data with the identifier added thereto. In the receiver node, the identifier added to the received data is compared with an identifier added to a data reception area thereof. If mismatching results, interruption is caused in a processor of the receiver node.

1 Claim, 26 Drawing Sheets

FIG. 6

| | SENDER NODE | RECEIVER NODE |
|---|---|---|
| INITIALIZATION PROCESSING | COMBUF_ALLOC<br>(FIRST VIRTUAL ADDRESS, AREA SIZE, TYPE FLAG) | COMBUF_ALLOC<br>(FIRST VIRTUAL ADDRESS, AREA SIZE, TYPE FLAG) |
| | COMBUF_OPEN<br>(RECEIVER NODE NO., RECEPTION COMBUF NO.) | |
| COMMUNICATION PROCESSING | COMBUF_WRITE<br>(RECEIVER NODE NO., RECEPTION COMBUF NO., TRANSMISSION COMBUF NO.)<br>•<br>•<br>•<br>•<br>COMBUF_WRITE<br>(RECEIVER NODE NO., RECEPTION COMBUF NO., TRANSMISSION COMBUF NO.) | COMBUF_WATCH<br>(RECEPTION COMBUF NO.)<br>•<br>•<br>•<br>•<br>COMBUF_WATCH<br>(RECEPTION COMBUF NO.) |
| TERMINATION PROCESSING | COMBUF_CLOSE<br>(RECEIVER NODE NO., RECEPTION COMBUF NO.) | |
| | COMBUF_FREE<br>(TRANSMISSION COMBUF NO.) | COMBUF_FREE<br>(RECEPTION COMBUF NO.) |

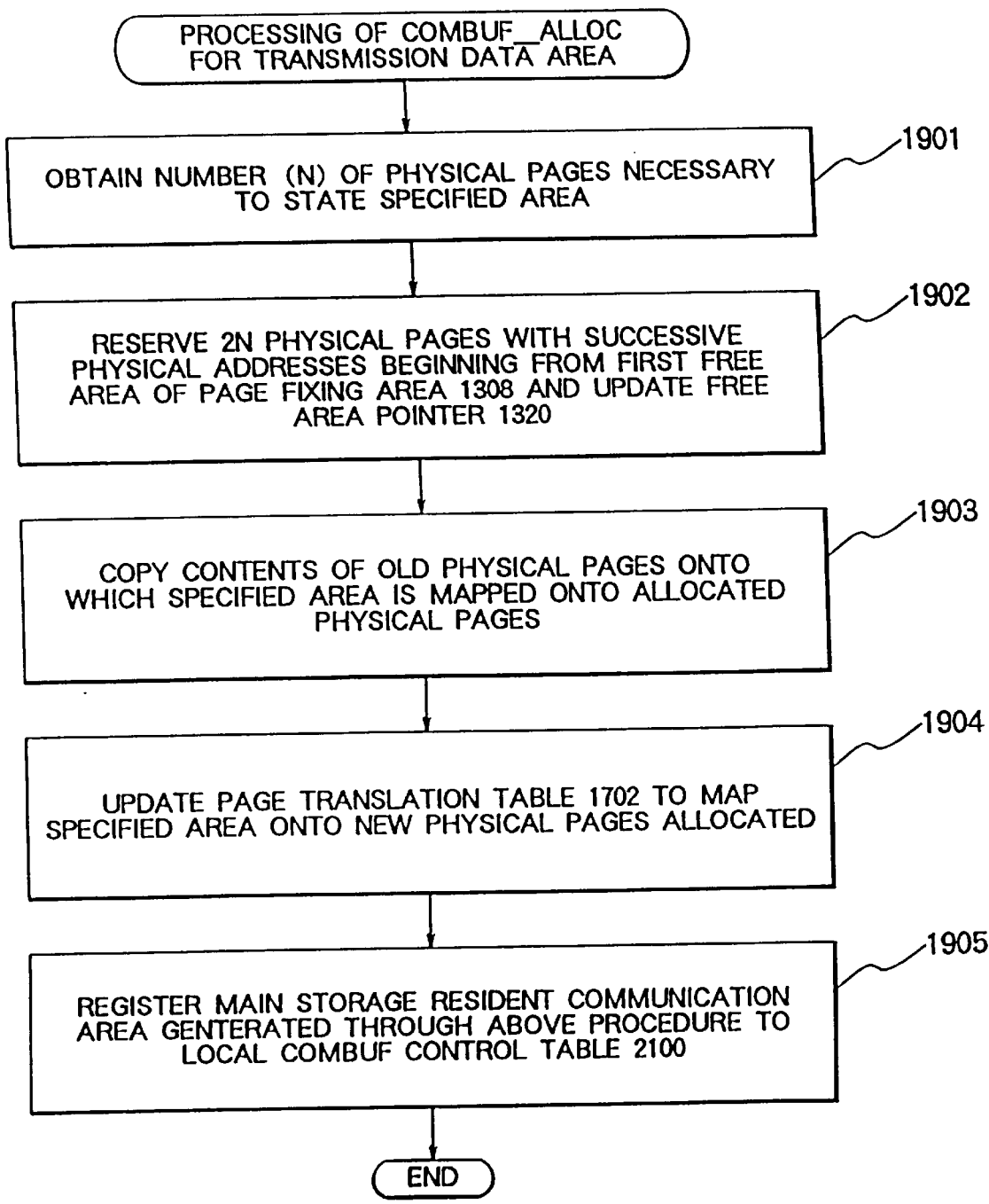

FIG. 20

| PHYSICAL PAGE SIDE A | SIDE B | FIRST ELEMENT | LAST ELEMENT | DIRECTION OF SUCCESSION | RANGE OF ELEMENT | |
|---|---|---|---|---|---|---|
| Page1 | Page3 | Array[0][0] | Array[0][511] | Row | Top (receive) | First half |
| Page5 | Page7 | Array[0][512] | Array[0][1023] | Row | Top (receive) | Last half |
| Page9 | | Array[1][0] | Array[1][511] | Row | Top (send) | First half |
| Page11 | | Array[1][512] | Array[1][1023] | Row | Top (send) | Last half |
| Page13 | | Array[1022][0] | Array[1022][511] | Row | Bottom (send) | First half |
| Page15 | | Array[1022][512] | Array[1022][1023] | Row | Bottom (send) | Last half |
| Page17 | Page19 | Array[1023][0] | Array[1023][511] | Row | Bottom (receive) | First half |
| Page21 | Page23 | Array[1023][512] | Array[1023][1023] | Row | Bottom (receive) | Last half |
| Page25 | Page27 | Array[0][0] | Array[511][0] | Column | LeftBuf (receive) | First half |
| Page29 | Page31 | Array[512][0] | Array[1023][0] | Column | LeftBuf (receive) | Last half |
| Page33 | | Array[0][1] | Array[511][1] | Column | LeftBuf (send) | First half |
| Page35 | | Array[512][1] | Array[1023][1] | Column | LeftBuf (send) | Last half |
| Page37 | | Array[0][1022] | Array[511][1022] | Column | RightBuf (send) | First half |
| Page39 | | Array[512][1022] | Array[1023][1022] | Column | RightBuf (send) | Last half |
| Page41 | Page43 | Array[0][1023] | Array[511][1023] | Column | RightBuf (receive) | First half |
| Page45 | Page47 | Array[512][1023] | Array[1023][1023] | Column | RightBuf (receive) | Last half |

FIG. 24

Local combuf control table (LCT) 2100

| Combuf NO. 2102 | Access right code 2103 | Double buffer 2104 | Buffer side 2105 | First physical address 2106 | Size 2107 |
|---|---|---|---|---|---|
| 0 | □□□□□□□ | Present | SideA | □□□□□□□ | 2pages |
| 1 | □□□□□□□ | Absent | — | □□□□□□□ | 2pages |
| 2 | □□□□□□□ | Absent | — | □□□□□□□ | 2pages |
| 3 | □□□□□□□ | Present | SideA | □□□□□□□ | 2pages |
| 4 | □□□□□□□ | Present | SideA | □□□□□□□ | 2pages |
| 5 | □□□□□□□ | Absent | — | □□□□□□□ | 2pages |
| 6 | □□□□□□□ | Absent | — | □□□□□□□ | 2pages |
| 7 | □□□□□□□ | Present | SideA | □□□□□□□ | 2pages |

FIG. 25

2200 Remote combuf control table (RCT)

| Node NO. | combuf NO. | Access right code | Double buffer | Buffer side | First physical address | Size |
|---|---|---|---|---|---|---|
| 5-6 | 0 | □□□□□□□□ | Present | SideB | □□□□□□□□ | 2pages |
| 7-6 | 3 | □□□□□□□□ | Present | SideB | □□□□□□□□ | 2pages |
| 6-5 | 4 | □□□□□□□□ | Present | SideB | □□□□□□□□ | 2pages |
| 6-7 | 7 | □□□□□□□□ | Present | SideB | □□□□□□□□ | 2pages |

METHOD FOR INTERPROCESSOR COMMUNICATION

This application is a continuation application of U.S. Ser. No. 08/126,088, filed Sep. 23, 1993, U.S. Pat. No. 5,659,777.

CROSS-REFERENCE TO RELATED APPLICATIONS

This invention is related with a co-pending patent application Ser. No. 07/853,427 filed by N. HAMANAKA et al. on Mar. 18, 1992.

BACKGROUND OF THE INVENTION

The present invention relates to a data communication method for use in data communications between computer systems connected via a network. The invention is particularly suitable for implementation of a low-overhead high-speed communication function necessary for parallel processing and the like.

In an interprocess communication in a distributed processing system or a parallel processing system employing a distributed memory architecture, a plurality of sender or transmission processes and a plurality of receiver or reception processes simultaneously exist for each node and it is necessary to transfer data from a sender process of each node to a receiver process of another node. In this operation, a process executed in each node ordinarily utilizes a virtual memory space. In contrast therewith, according to a network communication function to be achieved in a hardware level, data is only transferred from a sender node to a specified receiver node. Namely, in the hardware level, there is provided a function in which a receiver node is specified so as to transfer data thereto in a packet unit.

In general, to remove the gap between the software and the hardware, the following processing is executed by an operating system.

1) Buffering: According to this processing, on a receiver node side, when a receiver processing is not running (a receiver process having issued "receive" is generally set to a block (pause) state until data arrives), received data is once stored in a receiver or reception buffer in a kernel. After the receiver process is again set to an execution state, the data is copied from the buffer of the kernel onto a reception area of the process.

2) Packet header addition and deletion: According to this processing, on a sender or transmission side, there is added header information to each packet to identify a sender process, a receiver process, etc. Moreover, on the receiver side, the header information is deleted from each packet.

3) Segmentation and reassembly: When data to be transmitted has a large amount and exceeds a unit (an upper limit value of the packet) which can be transferred at a time through a network, segmentation is achieved to subdivide the transmission data into a plurality of packets. Reassembly is conducted to restore received data thus subdivided into original continuous data.

4) Multiplexing and demultiplexing: In a demultiplexing operation, transmission requests issued from plural processes on the sender side are arranged in a sequential form to sequentially send the requests as packets onto the network. A demultiplexing operation supervises distribution of the packets received from the network to appropriate receiver processes.

Details of the processing above have been described, for example, in pages 14 to 36 and pages 103 to 121 of "InternetwORking With TCP/IP Volume 2" written by Douglass E. Commer and David L. Stevens.

The processing including the buffering, the packet header addition and deletion, and the multiplexing and demultiplexing implements the general-purpose interprocess communication astriding nodes. However, the number of steps required for the processing to execute software is naturally added to the overhead associated with the communication processing. Particularly, to implement operations necessitating a high-speed intranode communication, for example, to achieve a high-speed image transfer or to accomplish an application such as parallel arithmetic processing, the communication overhead becomes a problem.

SUMMARY OF THE INVENTION

To solve primarily the first one of the problems, several patent applications were filed as follows.

For example, according to the Japanese Patent Application Ser. No. 3-56469 (corresponding to U.S. Pat. No. 5,386,566 or German Patent Application P4208924.7 (filed on Mar. 19, 1992), there has been proposed a method in which a data reception buffer area to store transfer data is resident in a physical memory. Moreover, in the Japanese Patent Application Ser. 3-241094 (corresponding to the U.S. and German Patent Applications above), there has been proposed a method (to be referred to as a main storage residential communication method) in which an area to store transfer data is resident in a physical memory in each of the sender and receiver nodes.

In particular, according to the latter, there has been proposed a function to directly achieve a data transfer between areas set as resident areas in the main storage of the user application space. Namely, there is adopted a method in which in each of the sender and receiver node, a transfer data area is resident in a physical memory such that data is directly transferred from the physical memory of the sender node side to the physical memory of the receiver node side.

In the communication method in which the transmission and reception data areas are resident in the main storage, it is necessary for the sender side to specify a data write address of the receiver side.

In other words, information of a data write address of the receiver side is inserted in a header of transfer data such that the receiver side is required to write the received data in the main storage according to the address information.

In this connection, according to the JP-A-4-40551 and JP-A-1-194056 (corresponding to U.S. Pat. No. 5,297,255 or EPC Application Ser. No. 89101462.3 (filed on Jan. 27, 1989), there has been described that when a sender node transfers data, a write address thereof in a memory of the receiver side is transferred together with the data. However, in the description of the technologies, there has been missing a technology related to a case where programs executed in each node use a virtual memory space.

Although the main storage residential communication method above is simple in principle, there exist problems in practice as follows.

Problem 1) In the Japanese Patent Application Serial Nos. 3-56469 and 3-241094 previously filed (or U.S. patent application Ser. No. 07/853,427 filed on the basis of the Japanese Patent Application Ser. No. 3-241094), there has been employed a method in which data is transmitted with specification of a virtual address of the receiver side such that the virtual address is translated into a physical address by the receiver side.

However, the method in which the address translation is accomplished by the receiver side is attended with a drawback.

In a system including a large number of nodes, there occurs concentration of packets from many sender nodes to a receiver node. Such a situation takes place in an operation to load programs and initial data in which file access requests is concentrated on a node where the file exists. Moreover, a similar situation occurs also during a computation when a broadcast transmission is conducted, namely, in a case where responses to the broadcast transmission are returned at a time.

In such an occasion, for example, packets of 63 sender nodes are concentrated on a receiver node, the receiver side is simply required to have performance which is 63 times that of the transmission side. In consequence, it is necessary to possibly minimize the overhead of reception processing in the receiver node.

In this regard, the method in which the address translation is carried out by the receiver side is disadvantageous; whereas, the method of the present invention in which the physical address of the receiver side is specified by the sender side is advantageous because the overhead of reception processing can be reduced.

Problem 2) It is difficult to prevent data from being overwritten in a reception area.

In the main storage residential communication method in which data is directly written in a virtual address space of the receiver process without conducting the buffering operation, there possibly exists a chance in which data of a process on the receiver side is destroyed according to a data reception. That is, it is impossible to prevent an overwriting of the received data, namely, the received data may be written over data which is being used for computation by a process of the receiver side.

Problem 3) It is difficult to materialize means for establishing synchronization between transmission and reception with a minimized overhead matching the transfer performance of the high-speed network.

To prevent the overwriting of the data above, the execution timing is required to be synchronized between the transmission processing (send) and the reception processing (receive). For example, in a case where "send" is issued prior to "receive", there arises a problem of matching the timing between the sender and receiver sides.

Problem 4) It is difficult to sense or to detect an erroneous data transfer caused by a software bug or the like.

In the main storage residential communication method, without using the buffering operation, the reception data is directly written in the virtual address space of a process of the receiver side. Consequently, it is difficult to detect destruction of the contents of the memory on the receiver side caused by a wrong transfer or an invalid transfer.

Problem 5) In a case where the transfer data area occupies or astrides a plurality of pages, the processing becomes to be complex.

In a case where the transfer data area astrides a plurality of pages, only when the transfer data areas respectively of the sender and receiver sides are simply resident in the main storage (page fixing), it is impossible to guarantee that these virtual pages are allocated to successive addresses in the physical memory. This consequently leads to a complex processing of the sender node to read transfer data from plural pages and to rapidly read packet headers to transfer the obtained data. Alternatively, to increase the speed of the processing above, there is necessitated hardware for this purpose. This problem arises also in the node of the receiver side when the received data of plural pages and the packet headers thereof are written in an area.

A first object of the present invention is to provide an interprocessor data communication method capable of mitigating or minimizing processing of data reception in a data receiver node when the main storage residential communication method is adopted.

A second object of the present invention is to provide an interprocessor data communication method capable of preventing the data overwrite operation in a data receiver node when the main storage residential communication method is used.

A third object of the present invention is to provide an interprocessor data communication method capable of establishing synchronization between a plurality of nodes when the main storage residential communication method is adopted.

A fourth object of the present invention is to provide an interprocessor data communication method capable of easily checking an access right when the main storage residential communication method is utilized.

A fifth object of the present invention is to provide an interprocessor data communication method in a case where the main storage residential communication method is adopted and a plurality of pages are occupied by a data transmission area and/or a data reception area, the method being capable of achieving at a high speed a read operation and a write operation of data contained in the pages and packet headers for transfers thereof.

According to a first aspect of the present invention, a transmission data area and a reception data area are resident in the physical memories of the respective nodes. Prior to initiation of an actual data transfer, an address of the reception data area in the physical address space is memorized in the sender node. Before the data is transferred from the sender node to the receiver node, the address is added to the transfer data.

According to a favorable mode, when a reception data area is assigned to a physical memory in the receiver node, an address thereof is transferred from the receiver node to the sender node so that the address is memorized in the sender node.

According to a second aspect of the present invention, for a reception data area of a receiver side process in the virtual address space, two sides (sides A and B) of physical memory areas are assigned. On the receiver side, there is executed a page translation change-over processing in synchronism with an execution of reception processing to alternately achieve a change-over between the sides A and B for the mapping between virtual and physical pages. Moreover, on the sender side, there is executed a reception page change-over or switching processing in synchronism with an execution of transmission processing to alternately achieve a change-over between the sides A and B for data write physical pages of the receiver side.

According to a third aspect of the present invention, in a parallel computation processing method in which processes of the respective nodes execute an identical program code so as to mutually conduct data exchanges with processes in other nodes in a symmetric manner, the communication method above is adopted for the data exchange between the processes. In each process, after completely finishing transmissions to all of the partner processes, the process awaits reception of signals from the partner processes.

According to a fourth aspect of the present invention, prior to commencement of an actual data transfer, an access right code required to access a reception data area is notified to the sender side. The sender side adds the access right code to transfer data so as to transmit the resultant data such that the validity of the code is examined when the data is received.

According to a fifth aspect of the present invention, as transmission and reception data areas, there are reserved a plurality of partial data transmission areas at discrete positions or a plurality of partial data reception areas at discrete positions. Each of the areas has a size of a page which is a unit to allocate a real memory to a virtual memory and possesses a boundary matching a boundary of the page. Moreover, at preceding positions respectively adjacent to the plural partial data transmission or reception areas, there are reserved a plurality of partial header transmission areas to respectively keep packet headers for transfers of the respective data or a plurality of partial header reception areas to respectively keep packet headers together with received data. A packet header and partial data are successively read therefrom or are written therein.

Desirably, a plurality of partial packet transmission areas and a plurality of partial data transmission areas are alternately arranged; moreover, a plurality of partial packet reception areas and a plurality of partial data reception areas are alternately arranged.

BRIEF DESCRIPTION OF THE DRAWINGS

These and other objects and advantages of the present invention will become apparent by reference to the following description and accompanying drawings wherein:

FIG. 6 is a diagram showing protocol of the main storage residential communication method;

FIG. 7 is a diagram showing a processing procedure to assign combuf for transmission;

FIG. 20 is a table showing mapping of the main storage residential communication areas (combuf) onto physical pages;

FIG. 24 is a diagram showing a local combuf control table;

FIG. 25 is a diagram showing a remote combuf control table;

DESCRIPTION OF THE PREFERRED EMBODIMENTS

Referring next to the drawings, description will be given in detail of an embodiment according to the present invention.

Description will be next given of the hardware configuration and the physical memory construction of each node of a distributed parallel processing system to which the present invention is applied (Section 1), an outline of operation and the protocol of the main storage residential communication (Section 2), an outline of software constitution of the main storage residential communication (Section 3), an outline of operation of application programs in the distributed parallel processing system (Section 4), and a method of applying the main storage residential communication to the application programs and a parallel processing (cross-cascade data streaming) method in which the double buffering and the data flow control are combined with each other (Section 5).

§1.1 Outline of Hardware Configuration

Figure 1:
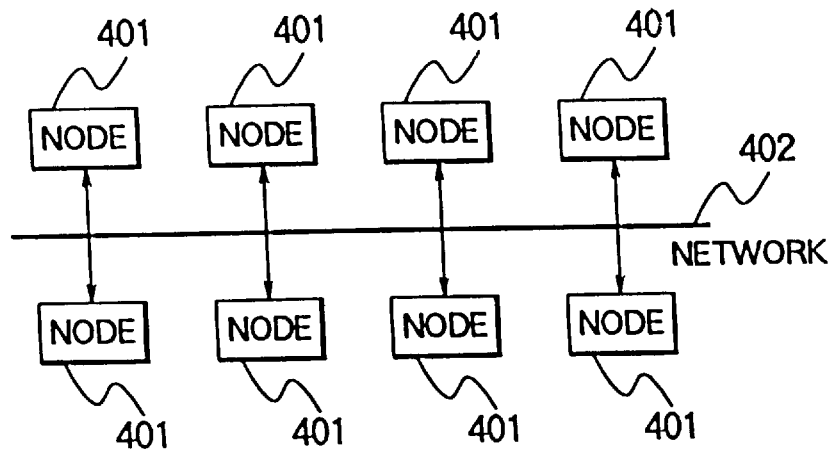
FIG. 1 is a schematic diagram showing the hardware construction of a parallel processing system.
Figure 2:
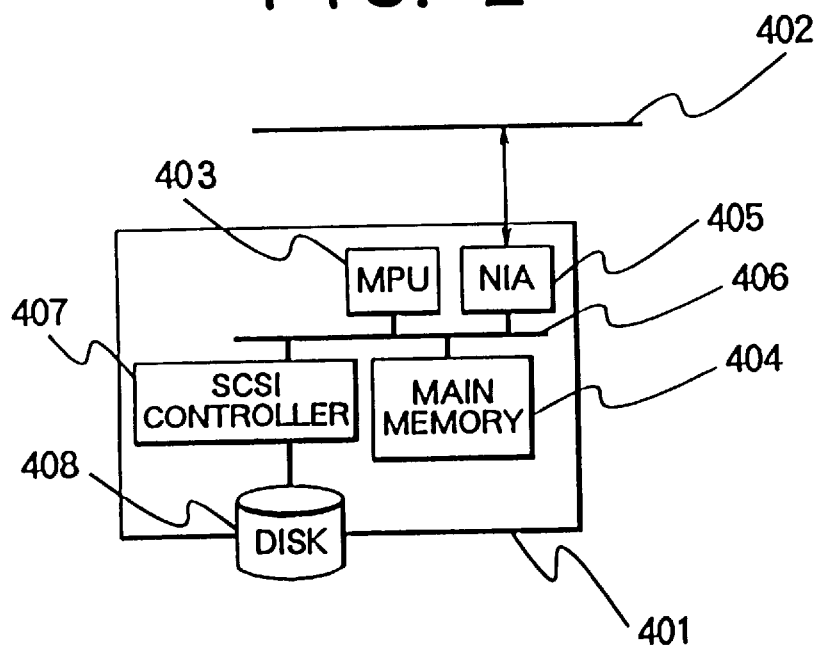
FIG. 2 is a diagram showing the hardware configuration of each node.
Figure 3:
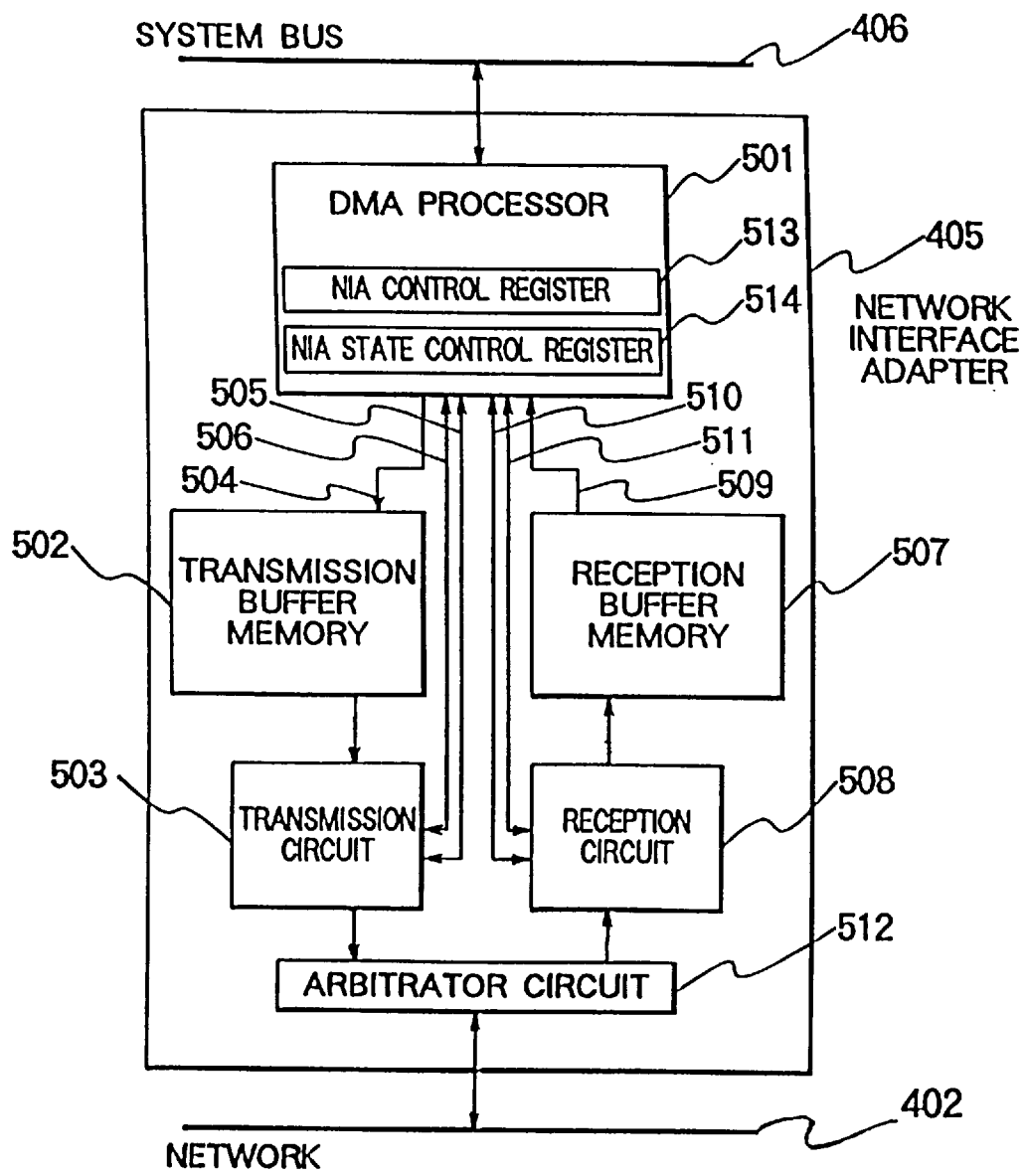
FIG. 3 is a diagram showing the hardware configuration of a network interface adapter.

FIGS. 1 to 3 show hardware configurations related to the distributed parallel processing system. The entire system includes a set of nodes 401 linked with each other via a network 402. The network 402 may include a data transfer bus. However, in this case, there is employed, as a more desirable network, a packet transfer network capable of transferring a plurality of packets in a concurrent fashion, for example, a network including crossbar switches. Each node 401 can transfer data via the network 402 to an arbitrary node 401. Each node 401 includes, as shown in FIG. 2, a microprocessor (MPU) 403, a main memory 404, a network interface adapter (NIA) 405, and a system bus 406 establishing connections therebetween. The NIA 405 includes as shown in FIG. 3 a general-purpose processor having a direct memory access (DMA) function (DMA processor) 501, a transmission buffer memory 502, a transmission circuit 503, a reception buffer memory 507, a reception circuit 508, and an arbitrator circuit 512. The circuit 512 supports a function to sense or to detect a collision between transmission data and reception data in the network so as to conduct, at an occurrence of collision, retransmission of transmission data when a period of time, which may be obtained through numerical randomization, is elapsed after the occurrence of collision. Also connected to the bus 406 is a disk device 408 via an SCSI controller 407.

Operation of the hardware for reception will next be described. On receiving data from the network 402, the circuit 508 once stores the data in the memory 507 and then causes via an interruption signal line 511 an interruption in the processor 501. The processor 501 conducts a DMA transfer of the data from the memory 507 via the bus 406 to the memory 404. When the transfer is finished, the processor 501 sends a reset signal via a reset signal line 510 to the circuit 508. According to the reset signal, the circuit 508 is enabled to receive subsequent data from the network 402. Moreover, in concurrence therewith, the processor 501 causes via the bus 406 an interruption in the MPU 403, thereby notifying the data reception.

Hardware operation in the transmission will be next described. In the transmission processing, the MPU 403 first prepares transmission data in the memory 404 and then activates the processor 501. In response thereto, the processor 501 achieves a DMA transfer of the transmission data from the memory 404 to the memory 502 (however, when the circuit 503 is accessing the memory 502, the initiation of the DMA transfer is retarded until the access is completed). When the transfer is terminated, the processor 501 transmits an initiation signal via a transmission initiation signal line 506 to the circuit 503. The circuit 503 sends the data from the memory 502 via the arbitrator circuit 512 to the network 402. When the transmission is completed, the circuit 503 causes an interruption in the processor 501 via a transmission termination interruption signal line 505. On receiving the interruption, the processor 501 creates an interruption in the MPU 403 via the bus 406 to notify the completion of the data transmission.

Initiation of the processor 501 by the MPU 403 is effected by setting a first address of transfer data to an NIA control register 513. Moreover, the MPU 403 can sense the NIA state by reading a NIA state register 514.

§1.2 Configuration of Physical Memory Space

Next, description will be briefly given of the constitution of the physical address space used by the main memory 404 of each node in the system according to the present invention.

Figure 4:
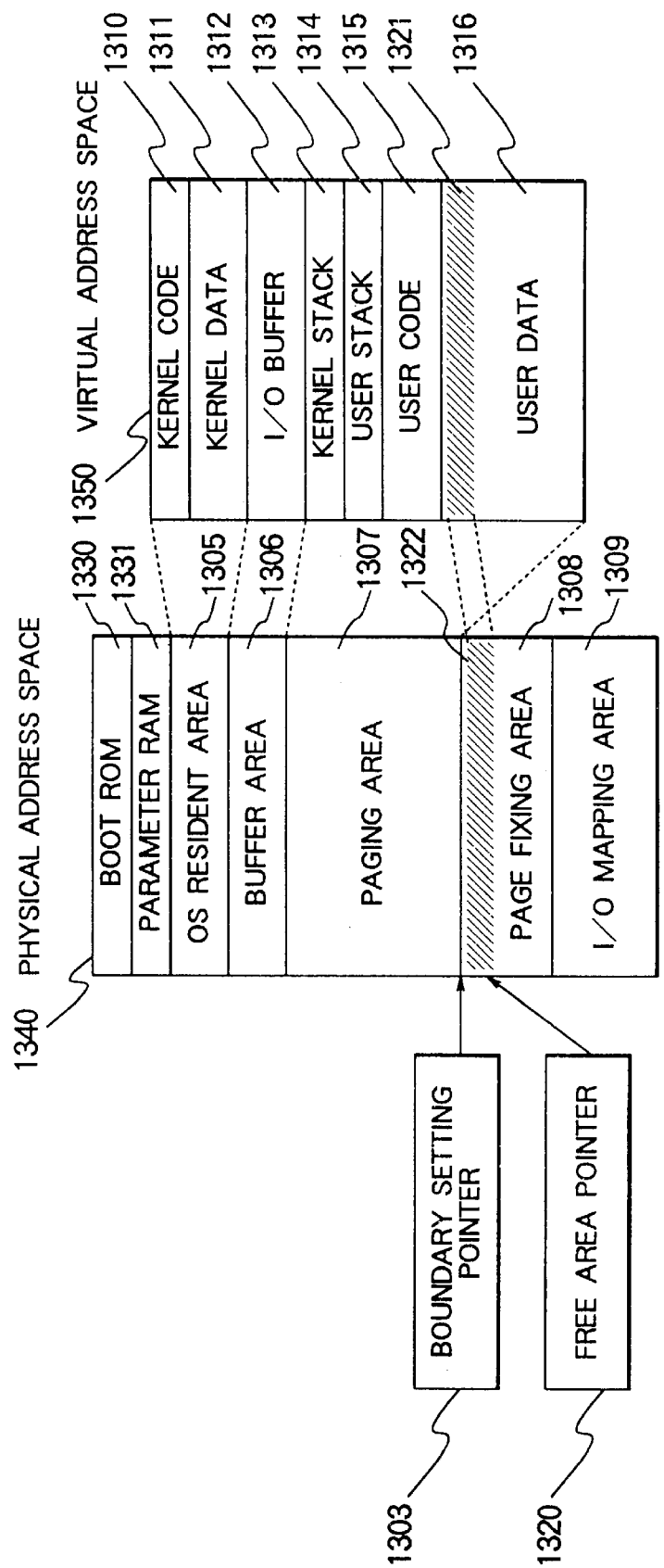
FIG. 4 is a diagram showing physical memory allocation.

As can be seen from FIG. 4, in a physical address space 1340 of each node, there is reserved a page fixing area 1308 to be used as a transmission and reception data areas. In the physical address space 1340, the area used as the area 1308 has a size which is specified when the operating system is initiated in each node (through a booting operation). Specifically, in a parameter random-access memory (RAM) area 1331, there is memorized a boundary setting pointer 1303 denoting a first position of the area 1308 such that the pointer 1303 is read by the operating system in the booting operation.

In a virtual address space 1350, a virtual page (a hatched portion 1321 of FIG. 4) mapped onto the area 1308 is not used for the automatic paging operation of the operating system. Namely, the portion 1321 is resident in the physical memory area (a hatched portion 1322 of FIG. 4). A free area or an unused area pointer 1320 designates a first position of a free area not used in the area 1308 and is updated by the operating system each time an area resident in the main storage 404 is allocated or released.

In an operating system (OS) resident area 1305, there is stored a kernel code 1310 and kernel data 1311 constituting the operating system. Moreover, a buffer area 1306 is used as an input and output buffer area 1312 for the disk device 408 or the like. In a paging area 1307, there are stored such information items necessary for each process as a kernel stack 1313, a user stack 1314, a user code 1315, and user data 1316. Stored in a boot read-only memory (ROM) 1330 is a code to load the operating system from the disk device 408 after the system is powered. An input/output (I/O) mapping area 1309 is adopted to map the control registers of the NIA 405 and the SCSI controller 407 onto the address space.

§2 Main Storage Residential Communication Protocol

This section describes an outline of operation and a protocol (communication procedures) used in the main storage residential communication.

Figure 5:
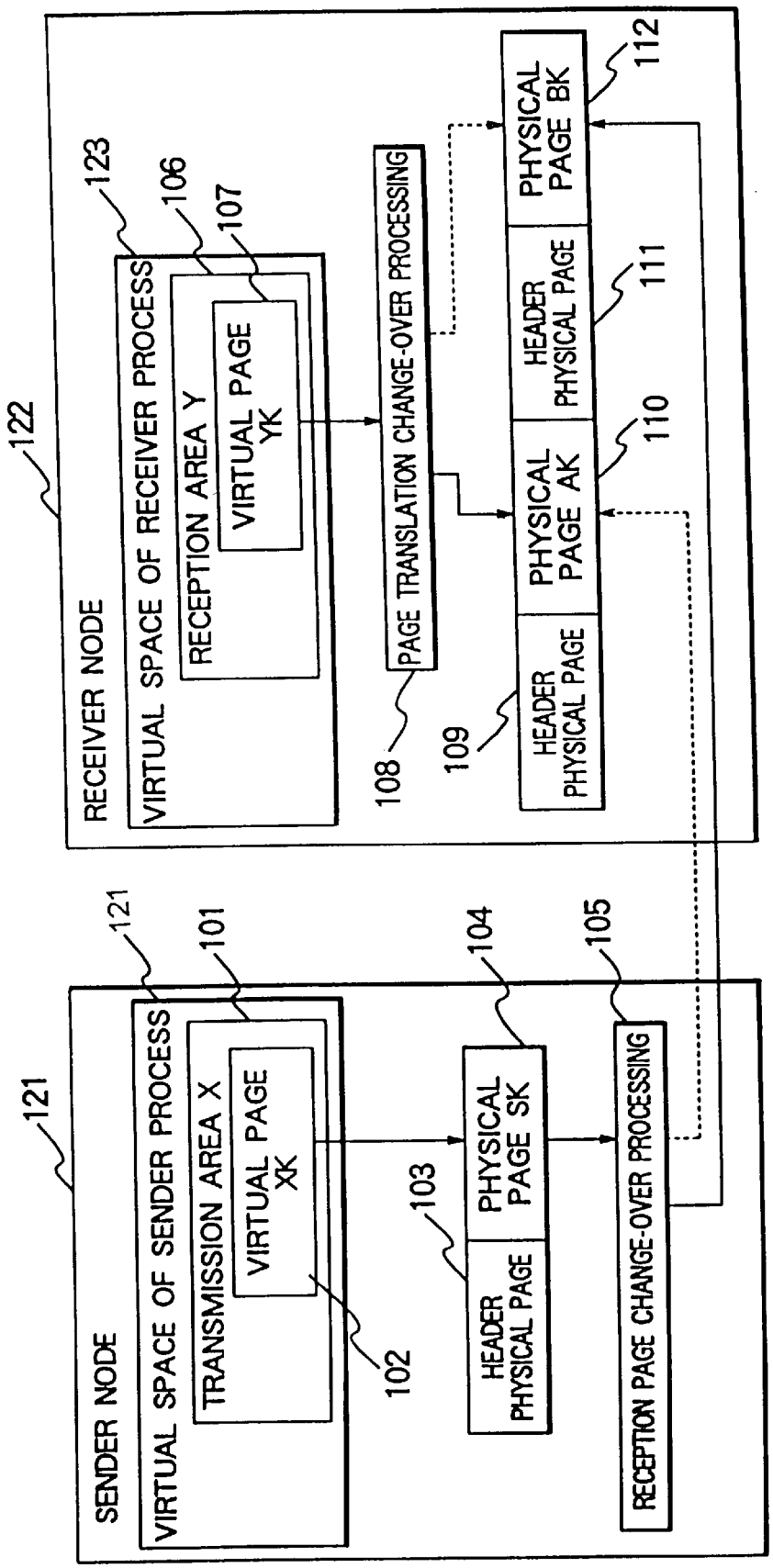
FIG. 5 is a diagram showing an outline of the main storage residential communication method.

First, the outline of operation will be described. FIG. 5 shows a case in which the contents of a virtual page (Xk) 102 of a data transmission area (X) 101 in a virtual address space 121 of a sender process operating in a sender node 120 are transferred to a virtual page (Yk) 106 of an area (Y) 107 in a virtual address space used by a receiver process operating in a receiver node. In FIG. 5, the virtual page (Xk) 102 is mapped onto a physical page (Sk) 104 by the operating system of the sender side. Moreover, in the node 122, the page (Yk) 107 of the data reception area 106 in a virtual space 123 of the receiver process is mapped through a change-over operation between physical pages (Ak) 110 and (Bk) 112. The mapping of the page (Yk) 107 onto either one of the physical pages (Ak) 110 and (Bk) 112 is controlled by a page translation change-over processing 108. The operating system on the sender side controls through a reception page change-over processing 105 an operation to decide to which one of the physical pages (Ak) 110 and (Bk) 112 the contents of the page (Sk) 104 are to be transferred.

In this embodiment, a sender side flag is reversed in the processing 105 each time the operating system of the sender side transmits data. Moreover, a receiver side flag is reversed in the processing 108 each time the operating system of the receiver side receives data. Accordingly, data is transferred to the page Bk when the receiver process is using the page Ak for computation. Conversely, when the receiver process is using the page Bk for computation, data is transferred to the page Ak. With the provision above, the problem of the overwriting operation associated with a data transfer is removed.

Next, an outline of the main storage residential communication protocol will be described by reference to FIG. 6. In this connection, in the description, "combuf_xxxx" denotes a name assigned to a routine of the operating system which is called by the user program to adopt functions of the communication. In the present specification, a transmission/reception data area resident in the area 1308 is called combuf herebelow. In this regard, a method of assigning combuf to the area 1308 will be described in detail in Sections 2.1 and 5.2.

1) Each of the sender and receiver sides issues combuf_alloc to allocate combuf to the area 1308.

2) The sender side issues combuf_open to establish connection to combuf of the receiver side.

3) The sender side issues combuf_write to transmit data to combuf of the receiver side.

4) The receiver side issues combuf_watch to wait for arrival of data.

5) The sender side issues combuf_close to discard connection to combuf of the receiver side.

6) Each of the sender and receiver sides issues combuf_free to release combuf of the area 1308.

Of the processing 1) to 6), the processing 1) and 2) is a pre-processing to be executed prior to a data transfer; the processing 3) is transmission processing and the processing 4) is reception processing; and the processing 5) and 6) is post-processing to be executed after the data transfer is completed. In the main storage residential communication, it is assumed that after the pre-processing is once conducted, processing of data transmission and reception is repeatedly achieved many times. Next, each processing will be described in detail.

§2.1 combuf_alloc processing

The combuf_alloc routine supports a function to allocate a portion of the virtual address space of a process (to be called a user process herebelow) executing a user program to the area 1308 of the main memory 404. The user program specifies the following parameters to call combuf_alloc.

1) First virtual address: Pointer indicating a first virtual address of a data area used as combuf. The address is required to match a page boundary.
2) Area size: Size (in the unit of bytes) of the data area used as combuf. The size is limited to an integral multiple of the page size.
3) Type flag: Specifies discrimination between transmission and reception data areas.

Figure 8:
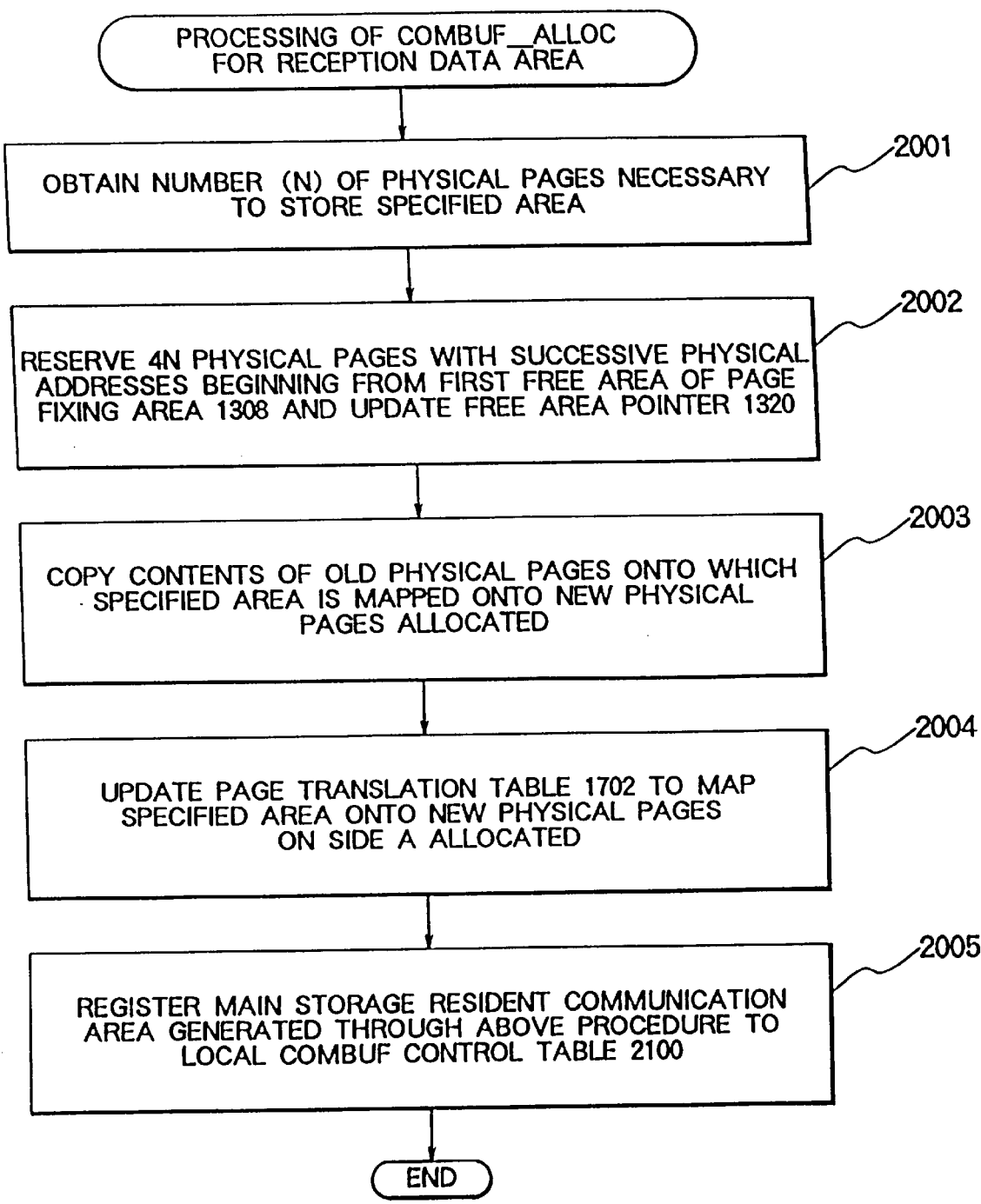
FIG. 8 is a diagram showing a processing procedure to assign combuf for reception.

FIGS. 7 and 8 show the combuf_alloc processing for the transmission and reception data areas, respectively. In either cases, the number of necessary physical pages is attained from the area size specified by the parameter (processing 1901 and 2001), physical pages are reserved in the area 1308, a page translation table 1702 is rewritten, and a free area pointer 1320 (FIG. 4) is updated (processing 1902 and 2002). The processing for the transmission data area is substantially the same as the processing above. However, of a group of virtual pages 1701 in the example of FIG. 9, a virtual reception data area 1701R is assumed to include pages 0 and 1 and a virtual transmission data area 1701S is assumed to include pages 2 and 3. In this case, to the two-page area 1701R, there is allocated an 8-page real reception data area 1705R; whereas, a 4-page real transmission data area 1705S is allocated to the two-page area 1701S. As above, to the area 1701R, there are allocated, for the double buffering, physical pages of which the number of pages is twice that of the area above.

Figure 9:
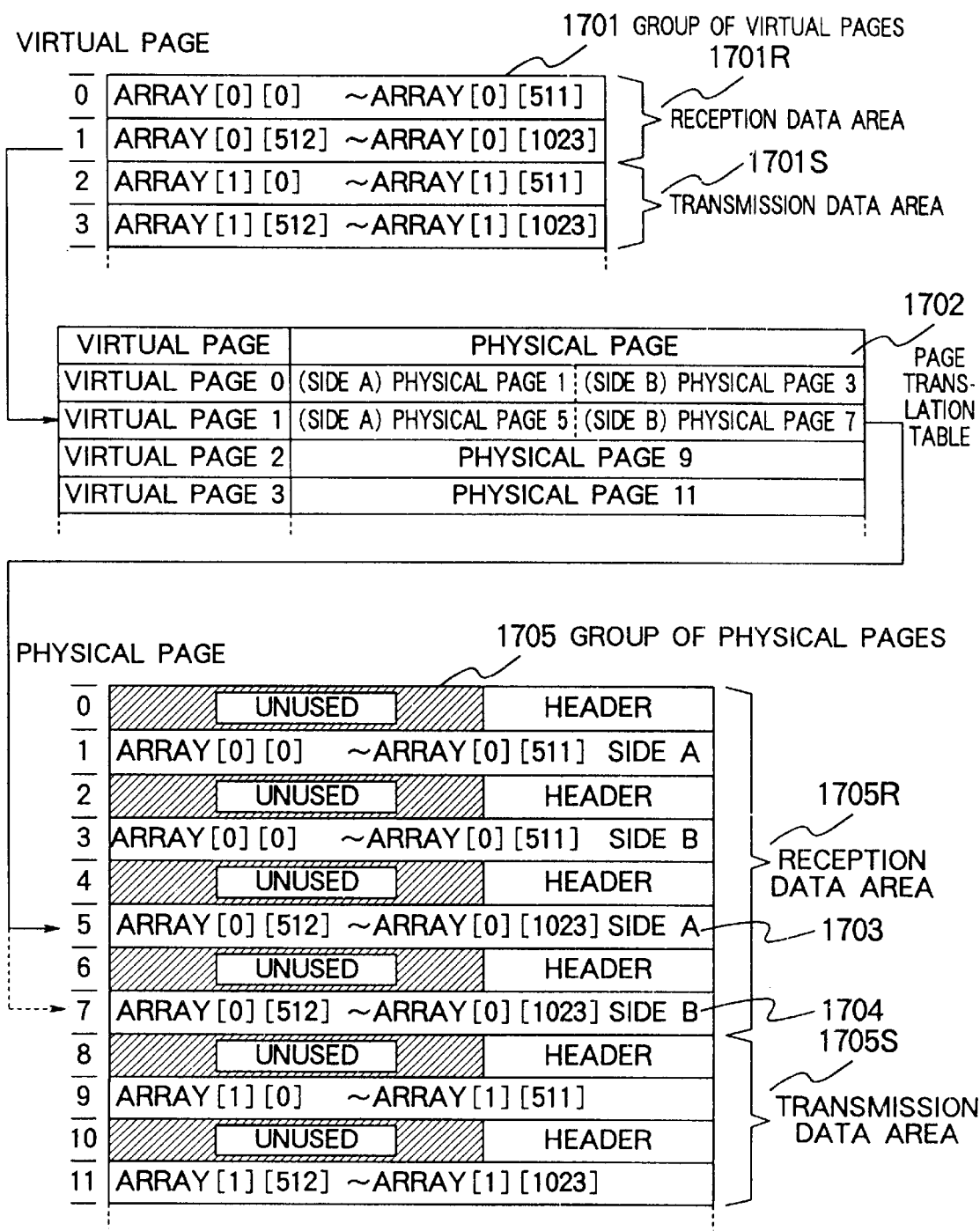
FIG. 9 is a diagram showing an example of mapping of the main storage residential communication areas (combuf) onto physical pages.

For example, to a virtual page 1 of FIG. 9 belonging to the reception data area, a side-A physical page 5 (1703) and a side-B physical page 7 (1704) of the group of physical pages 1705 are allocated. In addition, as can be seen from FIGS. 9 and 10, to store a packet header portion 2310 necessary for the data transfer, there is allocated a one-page extra memory in the page unit. Namely, an odd-numbered physical page is assigned for a virtual page of a user process and an odd-numbered physical page is used to store the header portion 2310.

When the physical pages are completely reserved, the contents of old pages mapped onto the data area specified by the parameter are copied onto the new physical pages thus allocated (processing 1903 and 2003). To map the respective pages of the data area onto the new physical pages, the page translation table (FIG. 9) is updated (processing 1904 and 2004).

To combuf allocated by combuf_alloc, a combuf number unique in the node is assigned by the operating system. In this example, for simplification, each combuf is assumed to be beforehand assigned with a number thereof. The combuf_alloc routine notifies the combuf number as a return value. The user program can uniquely identify each combuf according to a pair of the combuf number and the node number.

Finally, in the combuf_alloc routine, the new combuf is registered to a local combuf control table (LCT) 2100 shown in FIG. 24 (processing 1905 and 2005). The LCT 2100 is indexed according to combuf numbers to store therein for each combuf an access right code, presence or absence of a double buffer, a first physical address, a combuf size, etc. In the LCT 2100, there is registered only the combuf's in the node. The access right code includes a pair of a node number and a clock value (execution time of the combuf_alloc processing) and is assigned to each combuf each time combuf_alloc is issued.

§2.2 combuf_open processing

The combuf_open processing establishes a connection between the sender and receiver sides. The sender side acquires, through the combuf_open processing, information items such as a first physical address and a size of combuf and an access right code of the receiver side. The user program specifies the following parameters to call combuf_open.

1) Receiver node number: Node number assigned to the receiver side.

Reception combuf number: Combuf number of the receiver side.

In the combuf_open routine, there is conducted processing to copy a portion of the contents of the LCT 2100 (FIG. 24) of the receiver side onto a remote combuf control table (RCT) 2200 of the sender side shown in FIG. 25. Consequently, the combuf_open processing includes a portion to accomplish processing by the operating system of the sender side and a portion to accomplish processing by the operating system of the receiver side, which will be described later.

Figure 11:
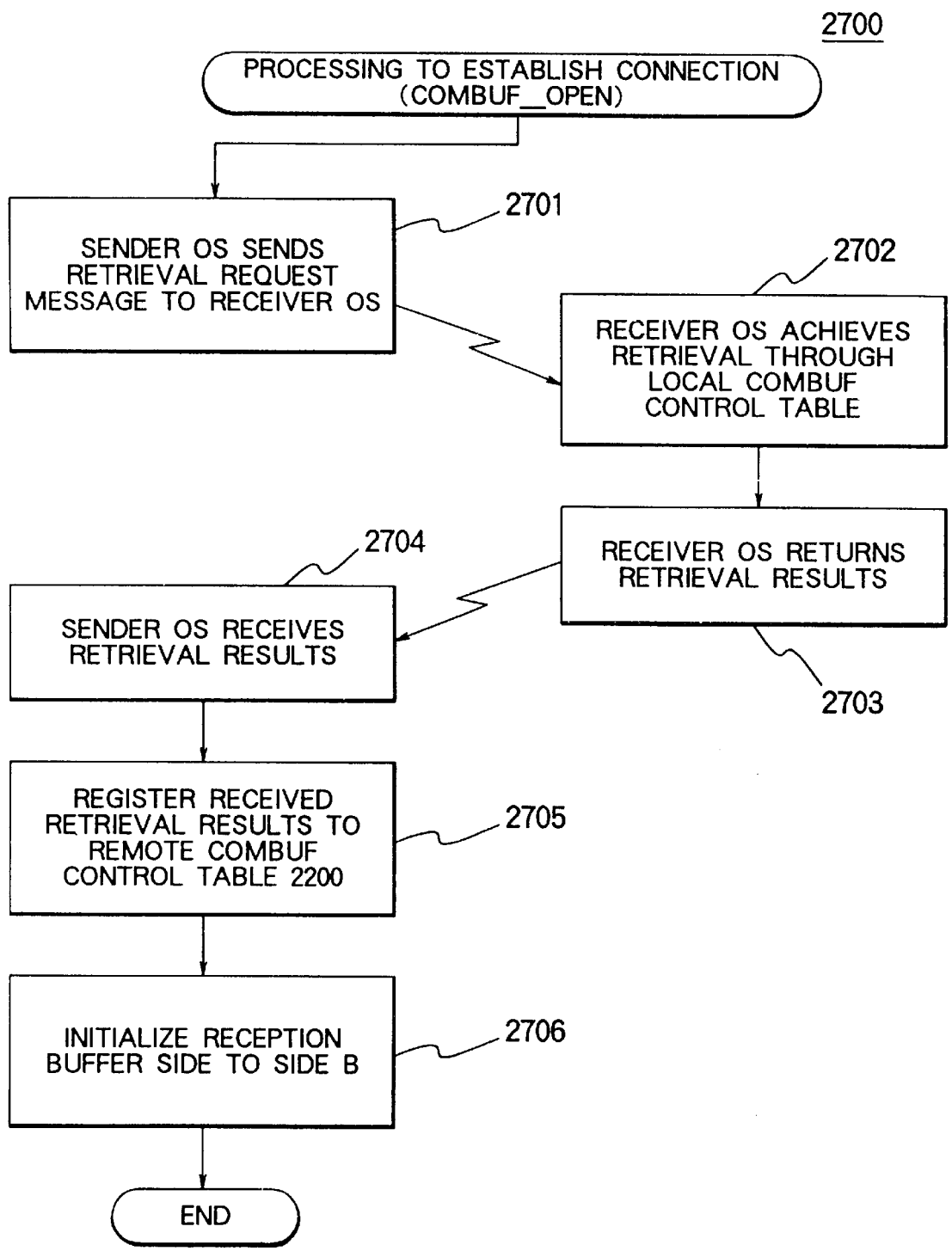
FIG. 11 is a diagram showing the processing flow of combuf_open.

First, the sender operating system specifies a combuf number to transmit to the receiver operating system a message to request retrieval of the LCT 2100 associated with the receiver combuf (processing 2701, FIG. 11). for this communication, there is employed an ordinary message communication using the buffering operation.

The receiver operating system searches entries of the LCT 2100 associated with the receiver combuf (processing 2702) to return as a result of the retrieval the contents of the table described above to the sender operating system (processing 2703). On receiving the retrieval results (processing 2704), the sender operating system registers information related to the reception combuf to the RCT 2200 of the own node (processing 2705).

In addition, to match the reception combuf side for use between the sender and receive sides, the reception buffer side to be first used is initially assigned for the side B of physical pages (processing 2706). Concretely, "1" is set to a buffer side field 2205 of the RCT 2200.

§2.3 Local and Remote combuf Control Tables

In the local combuf control table (LCT) of FIG. 24, there are registered only combuf's in the own node. To achieve communications with a partner node, it is necessary to acquire information such as a physical address and a size of combuf and an access right code of the partner node. For this purpose, there is utilized the RCT 2200 shown in FIG. 25.

To access the LCT 2100 of the partner side, it is necessary to conduct communications passing through nodes as described in Section 2.2. Consequently, the overhead of the access to the partner LCT 2100 is larger than that of the access to the own LCT 2100. Conducting a cache operation in the combuf_open processing in which information such as the first physical address of the receiver combuf is stored in the RCT 2200, it is unnecessary to access the partner LCT 2100 in the data transmission (combuf_write) routine, thereby removing the overhead.

The respective fields of the LCT 2100 and RCT 2200 have the following meanings.

1) combuf number: Number to identify combuf uniquely in the node.

2) Access right code: Code indicating an access right necessary to write reception data in combuf having the combuf number.
3) Double buffer: Denotes presence/absence of the double buffering. Presence thereof for a transmission combuf. Absence thereof for a reception combuf.
4) Buffer side: Indicates in the LCT 2100, for presence of double buffering, a side used for computation. Indicates in the RCT 2200 a side on which data is written.
5) First physical address: Indicates a physical address of first data of combuf having the combuf number.
6) Size: Designates a size of combuf having the combuf number.
7) Node number: Denotes a number assigned to a node in which combuf of the receiver side exists.

In this connection, the LCT 2100 is shared between the network interface adapter (NIA) 405 and the operating system. The operating system reads and writes data from and in any field of the LCT 2100. The NIA 405 uses a combuf number as an index to achieve a read access to an access right code field.

The operating system updates the LCT 2100 when combuf_alloc or combuf_free is issued from the user program. To prevent erroneous operations even when a packet arrives during the update due to a program bug or the like, the NIA 405 does not write data in the main memory 404 and causes an interruption in the MPU 403 when a packet arrives in a state where the access right code field of the LCT 2100 contains "0". To achieve the update processing, the operating system first writes "0" in the access right code field and thereafter updates other fields.

§2.4 combuf_write processing

Figure 12:
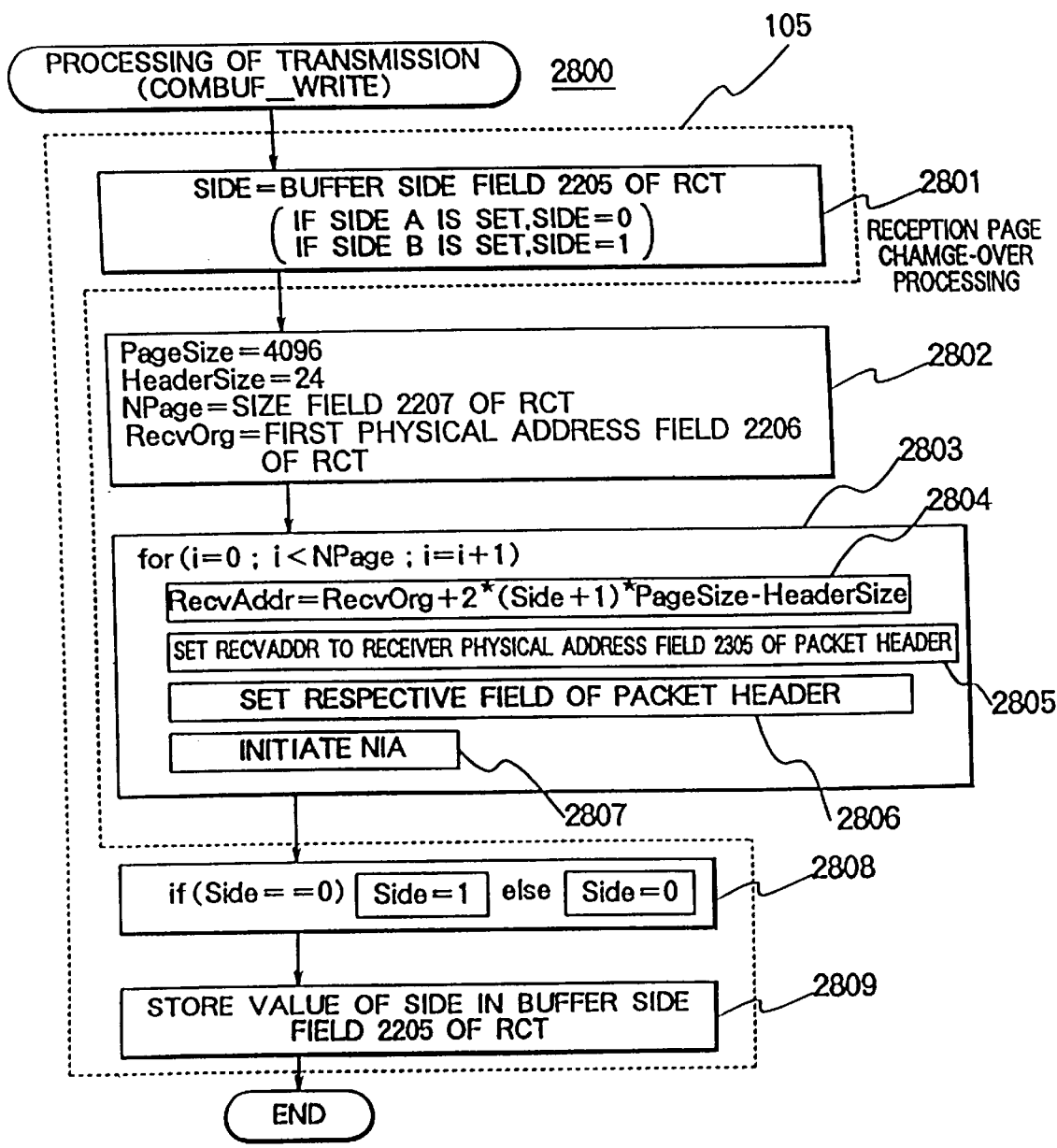
FIG. 12 is a diagram showing the processing flow of combuf_write.

The combuf_write shown in FIG. 12 transfers data from a transmission combuf to a reception combuf. The user program specifies the following parameters to call combuf_write.

1) Receiver node number: Node number of the receiver side.
2) Reception combuf number: combuf number of the receiver side.
3) Transmission combuf number: combuf number of the receiver side.

In the combuf_write routine, it is first decided which one of the sides A and B of the reception combuf is to be used for transmission. Moreover, when combuf has a size occupying a plurality of pages, there is also effected processing to compute a physical address of a reception area according to a first address of combuf for each page.

In processing 2801, the buffer side field 2205 of the RCT 2200 is referenced to determine the reception buffer side. Subsequently, the system initializes such variables as PageSize, HeaderSize, NPage, and RecvOrg (processing 2802). The variable Npage is used to store the number of pages of the reception combuf. The variable RecvOrg is adopted to store a first physical address of the reception combuf. This indicates, as shown in FIGS. 20 and 9, a first address of a first odd-numbered physical page of the side A in the reception combuf.

Next, in a for block 2803, transmission processing is accomplished for each page of the transmission combuf. A physical address of the receiver side is calculated for each page (processing 2804). In this operation, the value of HeaderSize is subtracted from the physical address to advance the physical address by the length indicated by the header size. This is because an odd-numbered page is reserved in the processing of combuf_alloc on each of the sender and receiver sides to write a header therein. Namely, a memory address transferred from the sender node in this embodiment is not a data write address transferred but a header write address preceding thereto.

The computed reception address RecvAddr is stored in a receiver physical address field 2305 of the header 2310 and then values are set to other fields 2301 to 2306, thereby initiating the NIA 405. In the initiation of the NIA 405, the operating system sets a first physical address of a transmission packet 2300 to the NIA control register 513. Accordingly, the NIA 405 transfers the packet via the network to the receiver node. The operation is subsequently achieved for plural pages of the transmission data area.

When the processing of the for block 2803 is finished and all pages of the transmission combuf are completely transmitted, there is conducted processing to switch the side of the reception buffer to the opposite side for use in the next transmission. Specifically, the value of a variable Side is reversed by an if sentence 2808 to store the reversed value of the variable Side in the buffer side field 2205 of the RCT 2200.

In this regard, the processing 2801, 2808, and 2809 shown in FIG. 12 corresponds to the reception page change-over processing 105 of FIG. 5.

§2.5 Packet Format

Figure 10:
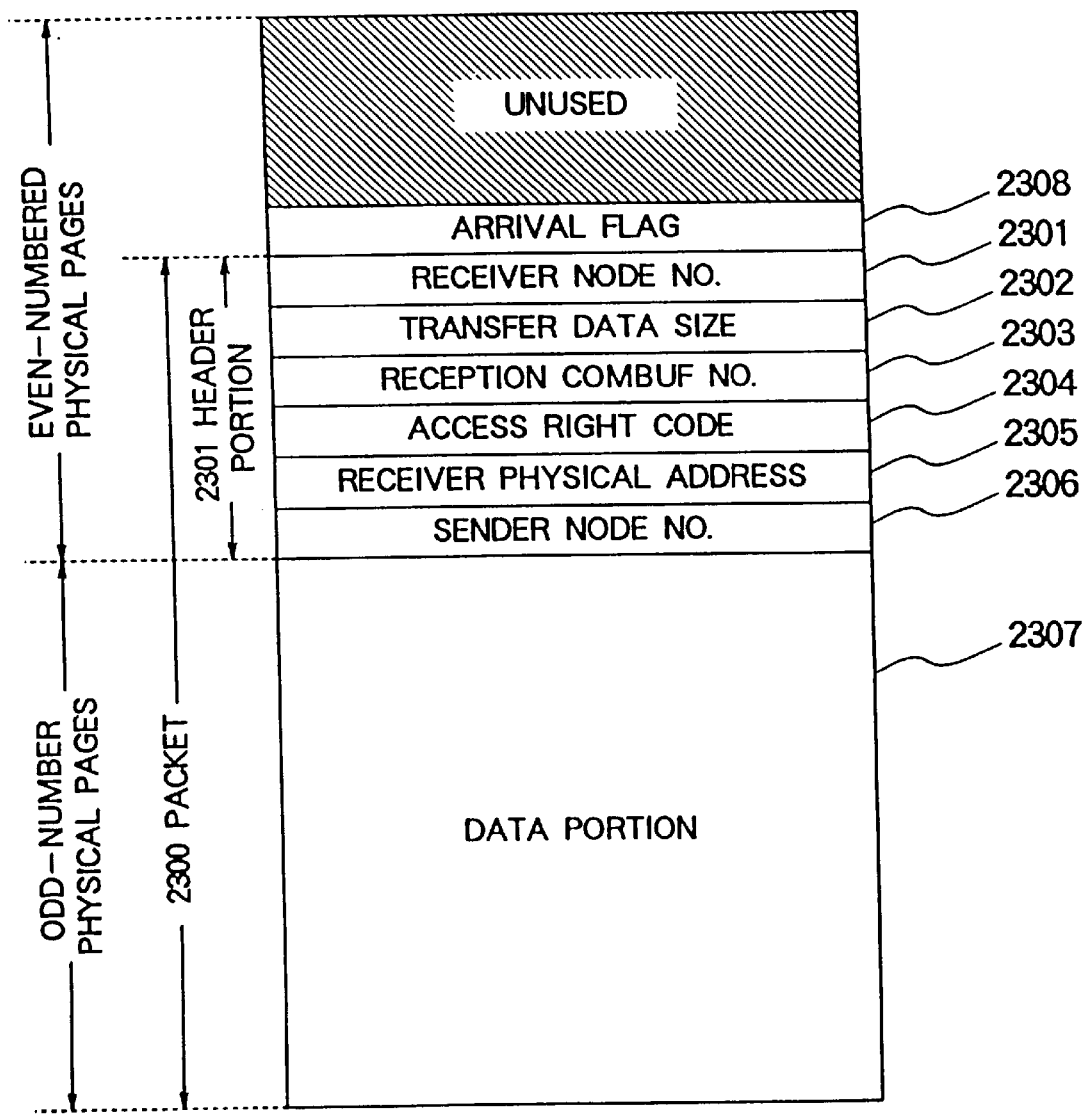
FIG. 10 is a diagram showing a packet format.

FIG. 10 shows the packet format used in the main storage residential communication method. Each field has the following meaning.

1) Receiver node number 2301: Node number of the receiver side.
2) Transfer data size 2302: Number of bytes of transfer data. Total of numbers of bytes respectively of the header portion and the data portion included in the packet.
3) Receiver combuf number 2302: Combuf number of the receiver node side. Using the combuf number, the receiver NIA 405 reads a pertinent entry from the LCT 2100 of the receiver side.
4) Access right code 2304: Access right code indicating an access right to the receiver combuf. Prior to initiation of a write operation of reception data, the receiver NIA 405 checks to determine whether or not the access right code matches that of the LCT 2100. If there occurs a mismatching condition between these codes, interruption of an invalid access right code is reported to the receiver MPU 403.
5) Receiver physical address 2305: Physical address where reception data is to be written.
6) Sender node number 2306: Node number of the sender node.
7) Data 2307: Data actually transferred from the sender combuf to the receiver combuf.

§2.6 combuf_watch processing

Figure 13:
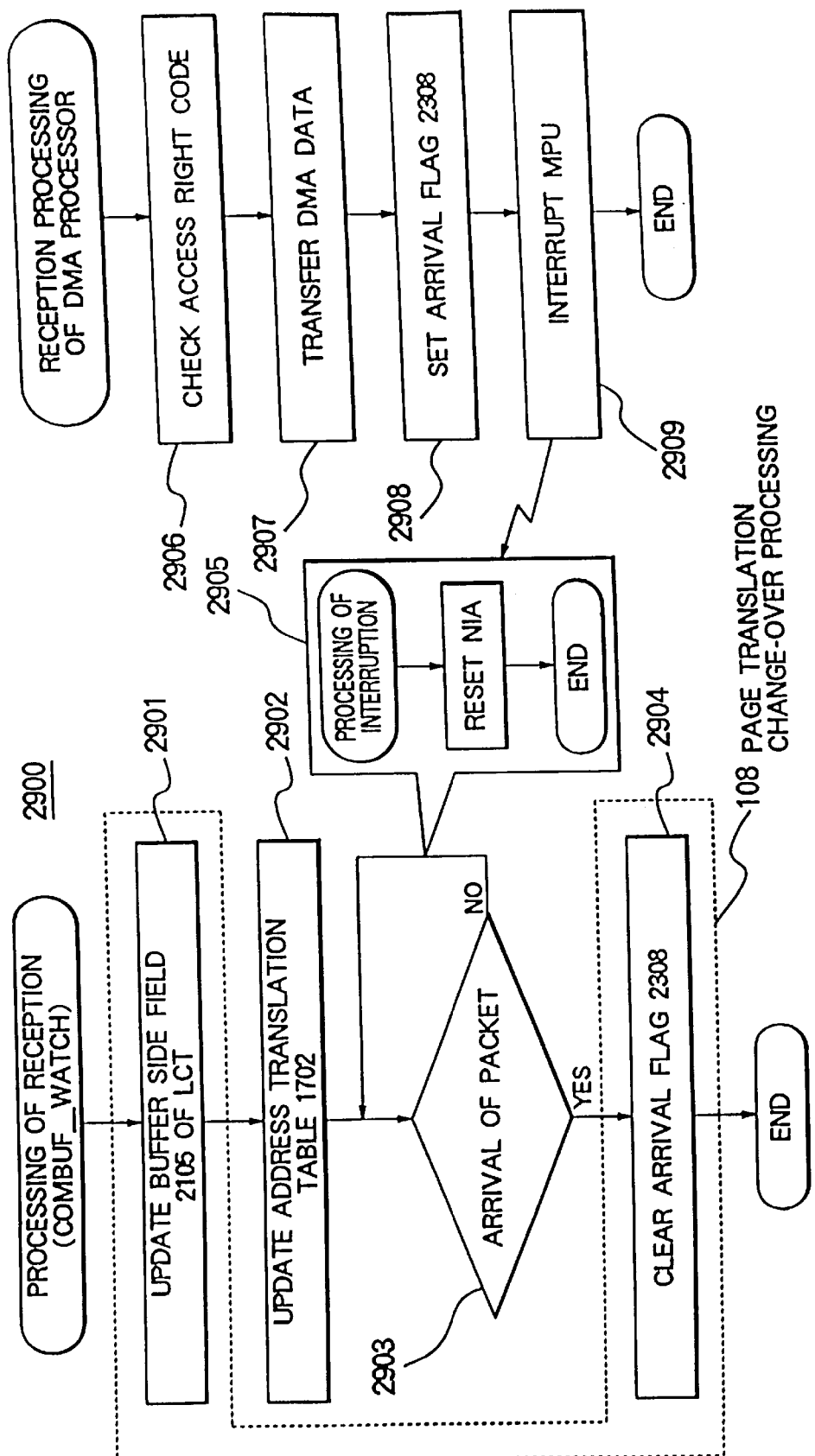
FIG. 13 is a diagram showing the processing flow of combuf_watch.

The combuf_watch processing 2900 of FIG. 13 supports a reception synchronization function to wait arrival of data at a specified combuf. The user program specifies a receiver combuf number as a parameter to call combuf_watch.

The reception synchronization processing is related to the MPU 403 as well as the processor 501. Processing 2906 to 2909 is executed by the processor 501. When data arrives from the network 402, the processor 501 checks the access right code of the data (processing 2906). In this operation, a check is made to determine whether or not the value of an access right code field 2304 of the header 2310 matches that of an access right code field 2103 of the LCT 2100. A retrieval operation through the LCT 2100 is accomplished by the processor 501 according to the value of a reception combuf number field 2303 of the header 2310. If the check between the codes results in mismatching, it is considered that an error has occurred due to a program bug or the like. Consequently, an interruption is caused in the MPU to notify the abnormality thereto.

If the codes match each other, the processor 501 reads the receiver physical address of the header 2310 to entirely transfer the received data including the header through a DMA operation from the memory 502 to an address of the memory 404 specified (processing 2907).

As above, the address added to the data transferred in this embodiment is not the write address of the data but the address of the header preceding the data. However, in this embodiment, since the received data is written in a location following the write location of the header by the NIA 405 through a DMA transfer, neither processing to determine an address for the data write operation nor special hardware for the processing is necessitated for the receiver node. In consequence, even when data is transferred from many sender nodes to a receiver node, the data can be written in the memory at a high speed.

Thereafter, when the DMA transfer is finished, the processor 501 sets an arrival flag 2308 to notify the data arrival to the receiver process (processing 2908) and then causes an interruption in the MPU 403 (processing 2909). An interruption processing routine 2905 on the MPU 403 side transmits a reset signal to the NIA 405, thereby enabling the NIA 405 to receive a subsequent packet. In this connection, as shown in FIG. 10, the flag 2308 (FIG. 10) is independently disposed for each of the sides A and B. For each flag, there is reserved one word preceding the header area.

On the other hand, in concurrence with the processing of the processor 501, the combuf_watch processing 2900 is executed by the MPU. In this processing, the reception buffer side is first switched. Specifically, a buffer side field 2105 of the LCT 2100 is updated (processing 2901) and a physical page field of the table 1702 (FIG. 9) is updated to indicate a physical page corresponding to the reversed side (processing 2902).

When the change-over of the reception buffer side is completed, an operation loop is effected to wait for an event in which data arrives and the flag 2308 (FIG. 10) is accordingly set (processing 2903). If data has already arrived and the flag 2308 has been beforehand set, control immediately leaves the loop. Moreover, in a case where data has not arrived yet, the wait is continued until the DMA processor sets the flag 2308 through the processing 2908. Actually, however, there is disposed an upper limit of the number of operations of the loop to prevent an infinite loop from being caused by a program bug or the like. When data arrives, the flag 2308 is cleared and then the reception processing is terminated.

In this regard, the processing 2901 and 2902 of FIG. 13 corresponds to the processing 108 shown in FIG. 5.

§2.7 Processing of combuf_close and combuf_free

The combuf_close erases entries of the table 2200 registered by combuf_open. The user program specifies as parameters a node number and a combuf number of a communication partner to call combuf_close. Furthermore, combuf_free clears a pertinent entry of the table 2100 to release the combuf. The user program specifies as parameters a combuf number of combuf to be freed to call combuf_free.

§3 Outline of Software Configuration

Figure 14:
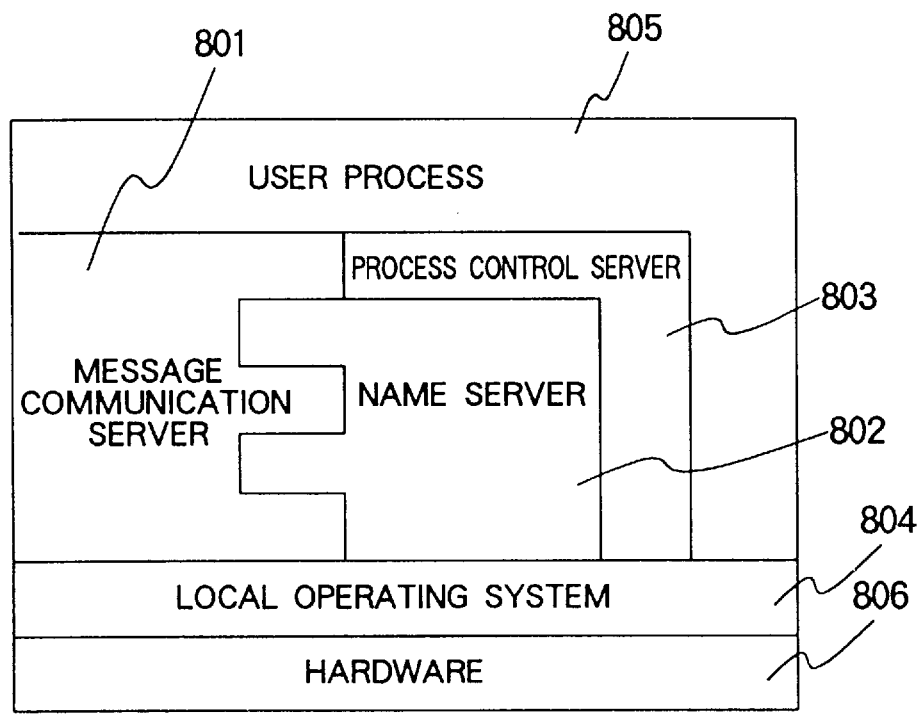
FIG. 14 is a diagram showing the constitution of an operating system of each node.

This section describes the software structure of the distributed parallel processing system by reference to FIG. 14.

In this system, an operating system shown in FIG. 14 is installed on hardware 806 of each node 401. As shown in FIG. 14, the operating system includes a local operating system 804, a message communication server 801, a name server 802, and a process control server 803. The system has a uniformly and symmetrically distributed constitution in which an identical operating system is mounted in each node. Any main-slave relationship does not exist between the nodes; moreover, there is not disposed a node which controls the overall system in a concentrative manner. Incidentally, a user process 805 is a process to execute application programs of the user and is not included in the operating system.

The local operating system 804 implements functions such as a process generation, a process scheduling, a virtual memory control, and a hardware resource control in the node. The server 803 supports a process control function astriding nodes such as a function to generate a new sub-process in an arbitrary node and to initiate execution of a user program in the sub-process. The server 801 provides an interprocess communication function in the node and an interprocess communication function between nodes. The server 801 issues an enquiry to the name server 802 for an existing position of the communication partner to decide a message receiver node. That is, the server 802 supports, to implement a positionally transparent message communication (data transfer), a function to control correspondence relationships between communication partner names and existing positions thereof.

The process control function between nodes and the positionally transparent interprocess communication function described above are, although differences exist between detailed points of implementation methods and functional specifications thereof, included in many distributed operating systems. These functions have been described, for example, in pages 52 to 105 of "Distributed Operating System: Following Unix" written by Mamoru Maekawa, Mario Tokoro, and Kentaro Shimizu.

In this regard, the message communication between operating systems is achieved according to a communication method using an ordinary buffering operations in the kernel, not according to the main storage residential communication method. The main storage residential communication method is adopted to exchange computation data between user processes.

§4 Outline of Operation of Application Programs

Figure 15:
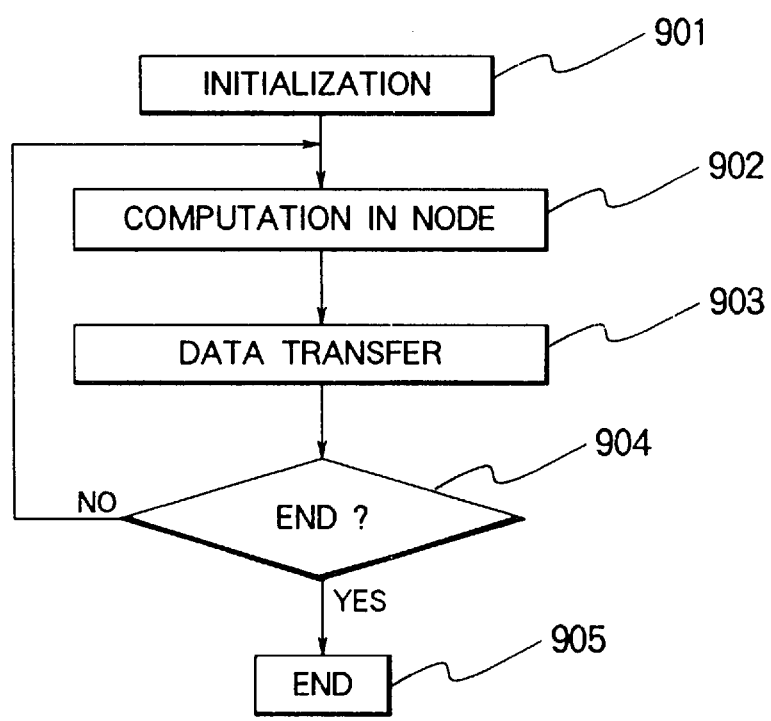
FIG. 15 is a flowchart showing the operation flow of an application program.

In this section, description will be given of an outline of operation of application programs in the distributed parallel processing system by reference to an example of a case where an identical program code is operated by each node. A parallel processing system like this example where the same program code is operated by each node is called a single program multiple data (SPMD) processing in general. FIG. 15 shows an outline of the flow of the program code processing. In this program, an initialization processing 901 is executed to invoke an identical program in all nodes such that computation processing 902 and data transfer processing 903 are repeatedly accomplished in each node. When a predetermined number of repetitious operations is completed (judged by decision processing 904), termination processing 905 is effected. In this connection, according to the embodiment, the main storage residential communication method is applied to the part of the data transfer processing 903.

To initially activate the program, a command to invoke the program is inputted from either one of the nodes 401 on the network 402. At a point immediately after the input of the command, the program starts running only in the node to first initiate execution of the processing 901. Incidentally, in the description below, it is assumed that a process is generated in association with an execution of a program and the process is released at a termination of the program. Moreover, it is also assumed that the process is executed only in the node where the process is generated, namely, the process is not moved to any other node.

Figure 16:
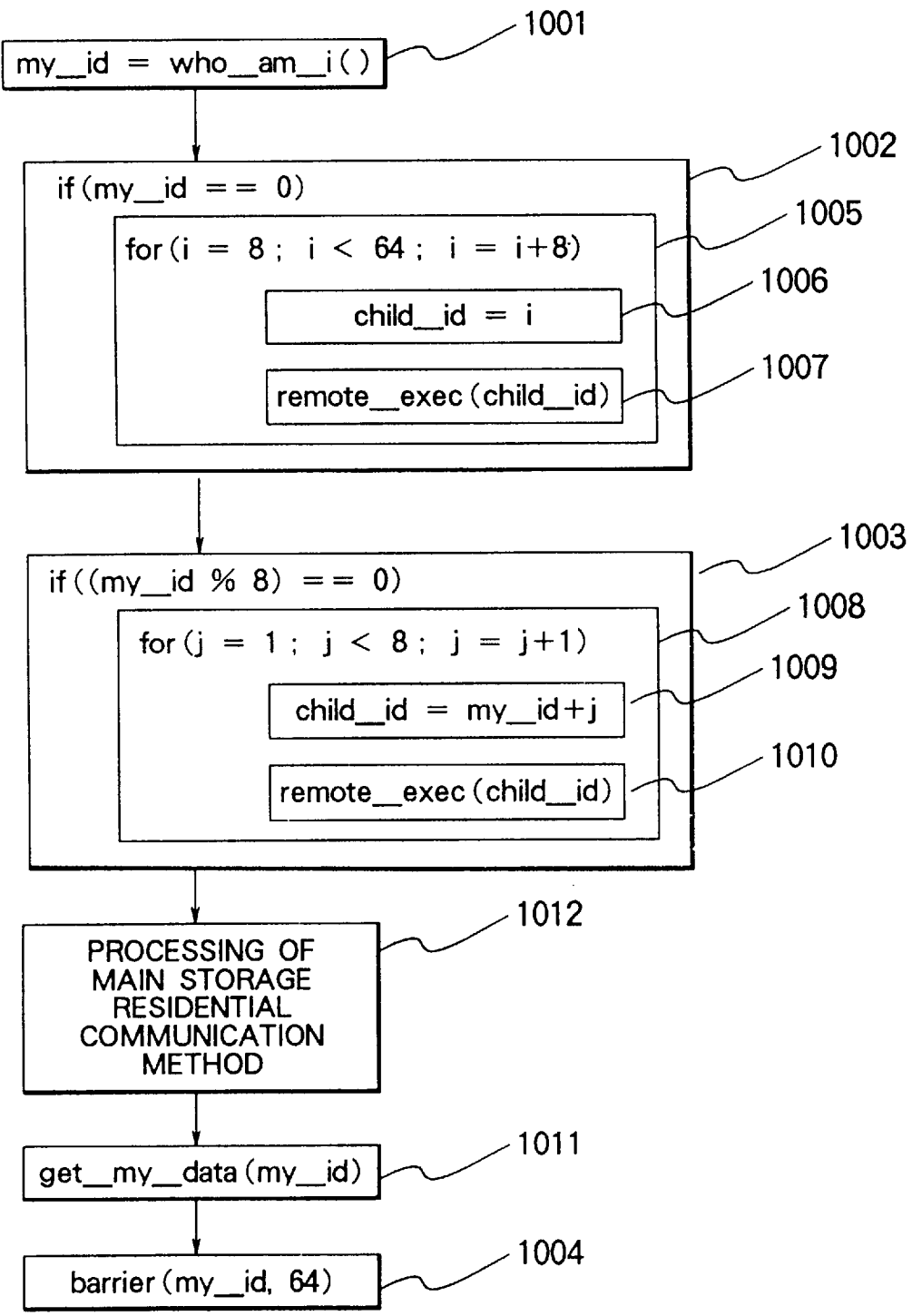
FIG. 16 is a flowchart showing the operation flow of a process initiation.
Figure 17:
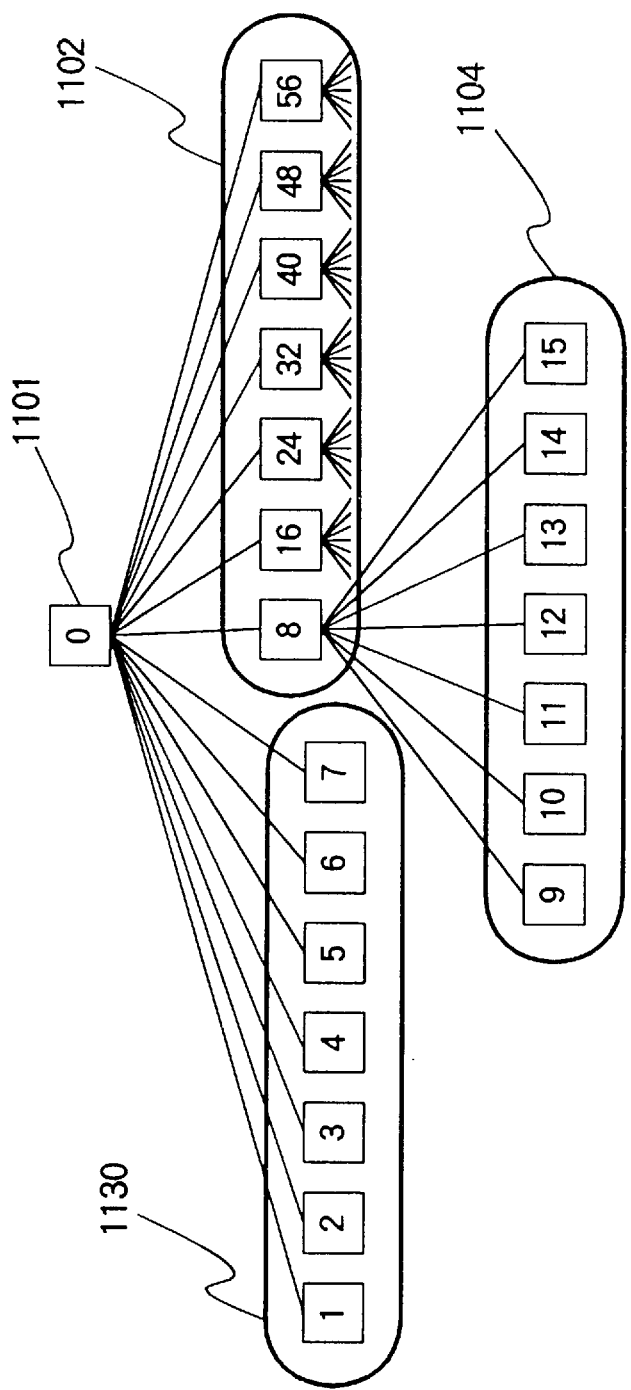
FIG. 17 is a diagram showing a hierarchic process activation.

FIG. 16 shows a detailed flow of the processing 901. An assignment statement 100 reads a name of the own process by a function who_am_i. Herebelow, an integer beginning from 0 will be assigned as the name of process so as to call, for example, "process 5". A process first invoked is a process 0. As a result of the judge statement of a if block 1002, when the own process is the process 0, a for block 1005 is executed. According to execution of the for block 1005, there are generated processes respectively in seven other nodes on the network 402 and then execution of a program code identical to the process 0 is started. That is, as shown in FIG. 17, a sequence of processes 1102 including processes 8, 16, 24, 32, 40, 48, and 56 are created as sub-processes of the process 0 (1101).

In this connection, a function remote_exec provides a function to generate a process in another node to load a program code identical to that of the own process, thereby initiating the code. An argument child id specifies a name (i.e. number) of a new sub-process to be created.

The sequence of processes 1102 executes, like the process 0, the sentences 1001 and 1002. Judgement of these processes result in "false" and hence the for block 1005 is not executed. The process 0 and the process series 1102 initiate execution of a for block 1008 according to judgement of a subsequent if block 1003. As a result of execution of the block 1008, each process creates sub-processes in seven other nodes on the network 402. In other words, as shown in FIG. 17, a sequence of processes 1103 including processes 1 to 7 and a sequence of processes 1104 including processes 9 to 15 are produced as sub-processes of the process 0 (1101) and the process 8. For each of the processes 16, 24, 32, 40, 48, and 56, there are generated seven sub-processes. The decision statement of each of the if blocks 1002 and 1003 results in "false" with respect to each of these sub-processes. Consequently, there is not created any sub-processes thereafter.

In this example, the processing generates a total of 64 processes and these processes start operations in parallel. In each of the 64 processes, after a pre-processing 1012 of the main storage residential communication is executed, a call of a function get_my_data 1011 is achieved to load initial data to be processed by the process. When the loading is finished, in order to await completion of the data loading operation of other processes, a call of a function barrier 1004 is conducted so as to establish synchronization between the processes. When the final process calls the function barrier, the processes in the wait state restarts the execution at a time. In this regard, in the decision of a node to produce sub-processes, the process control servers 803 of the respective nodes conduct communications with each other to achieve a control operation such that a plurality of processes are not assigned to a node.

When the processing 901 is completed, the process of each node initiates the computation processing 902. When the processing is finished, there is accomplished the data transfer processing 903 to transmit or to receive data to or from other processes. According to the processing 903, results of the processing 902 are exchanged between the processes. Until the computation is determined to be terminated by the decision processing 904, the processing 902 and processing 903 are repeatedly carried out. When an end condition is satisfied, each process executes the end processing 905 such that the execution of the user program is terminated in all nodes.

§5 Application of Main Storage Residential Communication

This section describes, by reference to an example of a parallel processing of an area subdivision type, a method of applying the main storage residential communication to application programs and a parallel processing method (cross-cascade data streaming method to be abbreviated as CCDS herebelow) developed by combining the main storage residential communication with a data flow control.

§5.1 Area-subdivision parallel processing

Figure 18:
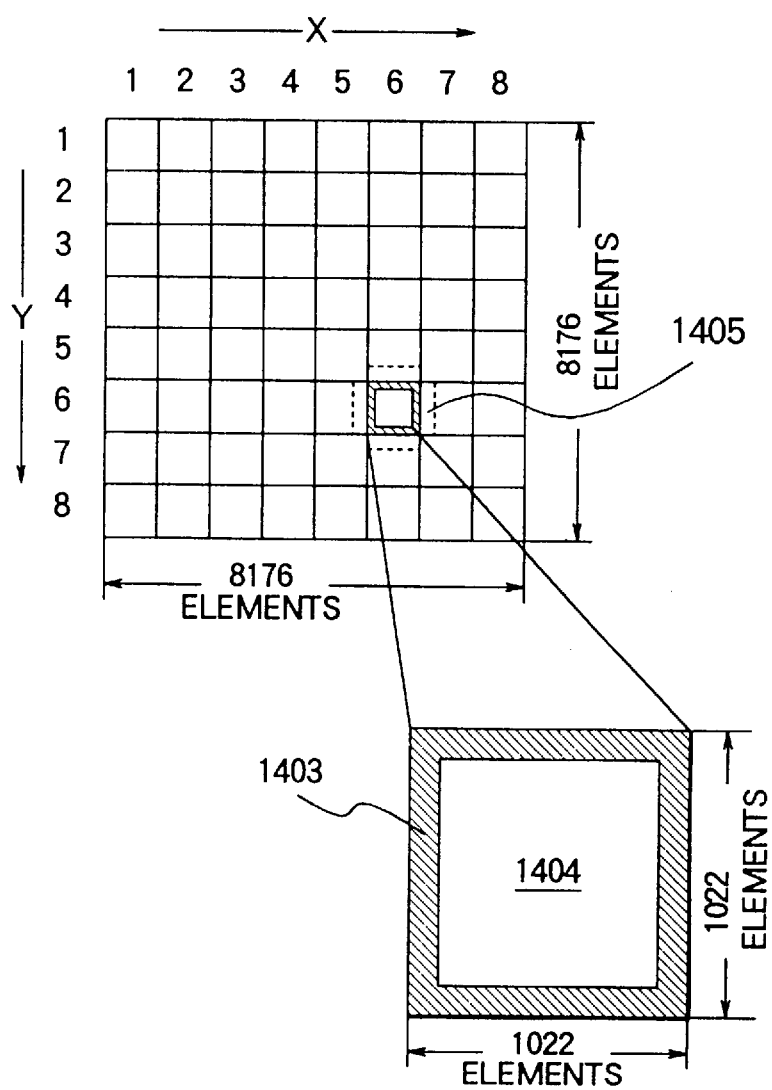
FIG. 18 is a diagram showing data array subdivision in a parallel processing of an area subdivision type.

In a case of parallel processing of a fluid analysis problem, a structure analysis problem, and the like, there has been usually employed a method of area-subdivision parallel processing in which array data is subdivided into a plurality of sub-arrays as shown in FIG. 18 so that a sub-array is assigned to each node for computation thereof. In the method of this kind, in a computation of a boundary portion (a hatched portion 1403 of FIG. 18) of the sub-array, data exchange is required to be conducted for adjacent nodes.

In the following description, there is considered a case where parallel processing is accomplished for array data of 8176 rows by 8176 columns shown in FIG. 18. The 8176-row by 8176-column array is subdivided by eight respectively in the row and column directions to obtain 64 1022-row by 1022-column sub-arrays. A process of each node performs computation for the 1022-row by 1022-column sub-array and repeatedly achieves processing to exchange boundary data 1403 other than internal processing data 1404 with processes of four adjacent nodes at the right, left, upper, and lower position thereof. In this connection, each element is represented by an 8-byte double-precision real number. Furthermore, a right-end column of each of eight sub-arrays of the right end portion of FIG. 18 is considered to be adjacent to a left-end column of the associated sub-array of the left end portion. Similarly, an upper-end row of each of eight sub-arrays of the upper end portion is considered to be adjacent to a lower-end row of the associated sub-array of the lower end portion.

Figure 19:
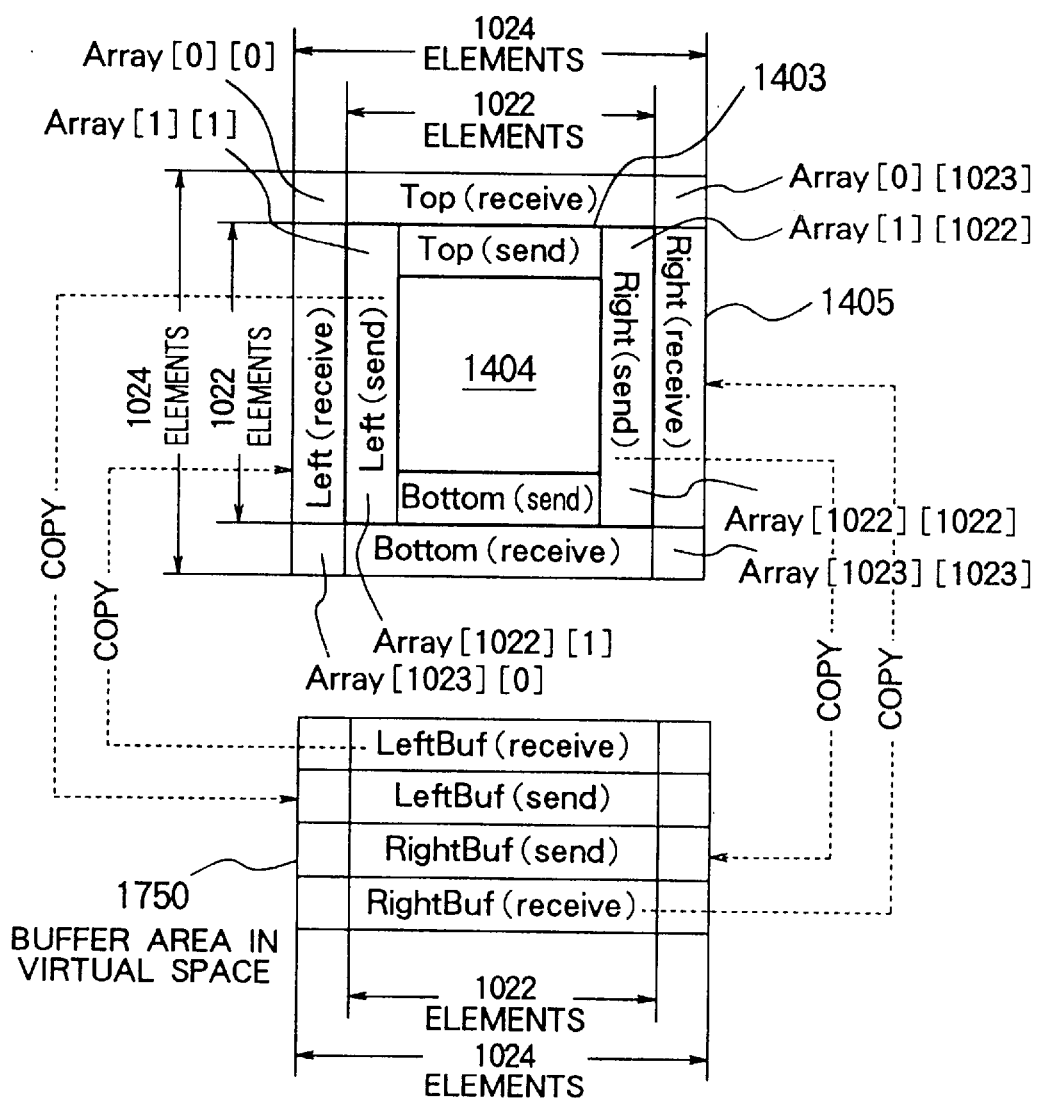
FIG. 19 is a diagram showing transfer areas in an array of each node.

In addition, as computation for each element of the array, there is assumed (smoothing) processing to calculate a mean value of the values of the element and four adjacent elements at the right, left, upper, and lower positions thereof. For this purpose, in a case of processing of the boundary data 1403 including an upper-most row, a lower-most row, a left-most column, and right-most column of the 1022-row by 1022-column array, there is required boundary data of the adjacent nodes. To enable the boundary data of the adjacent nodes to be stored, an array Array 1405 having a size represented as 1024-row by 1024-column is prepared in each node as shown in FIG. 19. That is, a row of Top (receive) and a row of Bottom (receive) are added, and hence two rows are added to 1022 rows to obtain 1024 rows. Similarly, a column of Left (receive) and a column of Right (receive) are added, and hence two columns are added to 1022 columns to obtain 1024 columns.

In this connection, the notation "Top (receive)" designates an area in which boundary data is received from the adjacent node on the top side. Moreover, a term "an adjacent node" does not indicate "a node physically adjacent thereto", namely, it is used to denote "a node in which a process to handle an adjacent sub-array exists". As shown in FIG. 18, assigning numbers along the X and Y axes, the hatched node thereof has X-Y coordinates "6-7" and adjacent nodes "6-5", "5-6", "7-6", and "6-7" (node numbers are represented by the X-Y coordinates herebelow in this specification).

After the computation is finished for each element of the data of Top (send), Bottom (send), Left (send), and Right (send) in the node, the data is sent to adjacent nodes. Since objects of the smoothing processing include the inside area including the portions Top (send), Bottom (send), Left (send), and Right (send), four elements indicated by hatched portions in FIG. 19, namely, Array [0] [0], Array [0] [1023], Array [1023] [0], and Array [1023] [1023] are not used for the computation. Incidentally, the subscript for the array begins with 0 like in the case of the C language. The first subscript indicates a position in the column direction (vertical direction of FIG. 19) and the second subscript indicates a position in the row direction (horizontal direction of FIG. 19).

Elements of the array Array are allocated to successive addresses in the row direction. That is, (virtual) addresses are continuous for adjacent elements of the Top and Bottom rows in the row direction. For adjacent elements of the Left and Right columns in the column direction, (virtual) addresses are discontinuous. In consequence, in a transmission of boundary data in the column direction, data is stored at successive addresses. Consequently, a copy is conducted from the array Array onto an array LeftBuf (send) and an array Rigthbuf (send). Moreover, in a reception of boundary data in the column direction, a copy is accomplished from an array LeftBuf (receive) and an array Rigthbuf (receive) onto the array Array.

§5.2 Virtual-Physical Mapping

Next, description will be given of arrangement of the array Array in the main storage. In this connection, it is assumed in the description that the page size is 4096 bytes in the system of the embodiment. Moreover, it is assumed that the maximum size of a packet to be transferred through the network is 4608 bytes so that one-page data can be transferred by one packet.

A first position of the array Array, namely, the element Array [0] [0] is assumed to be programmed to match a page boundary. In addition, also for each of the arrays LeftBuf (send), Rightbuf (send), LeftBuf (receive), and Rightbuf (receive) used as buffers in which boundary data in the column direction is stored, the first position is assumed to be programmed to match the page boundary. Since each element of the array Array is represented with an 8-byte double-precision real number and there exist 1024 elements along the row direction, data of a row of the array Array includes 8192 bytes and hence is just stored in two pages of the main storage. Consequently, the first position of each row of the array Array matches the page boundary.

Figure 26:
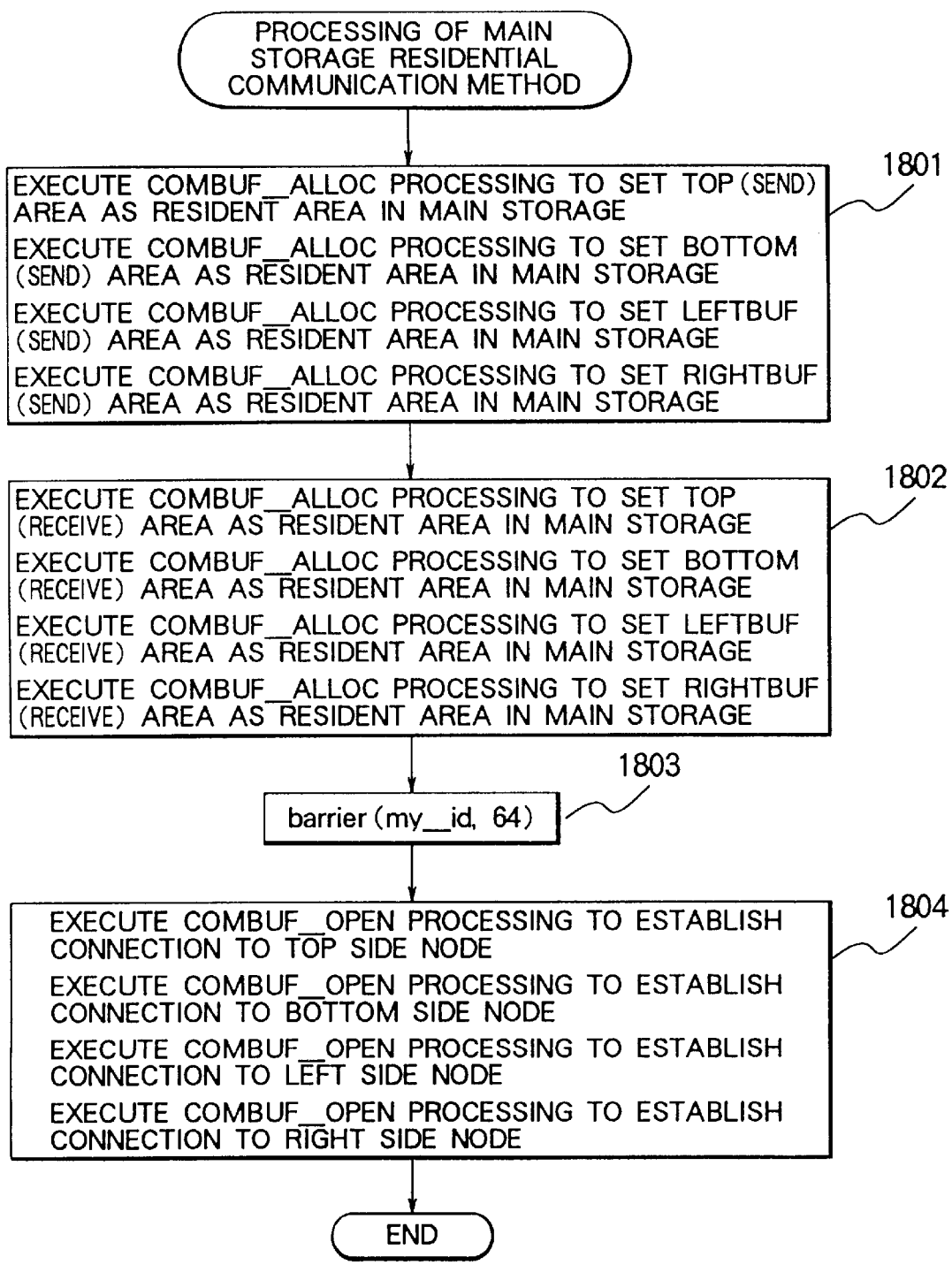
FIG. 26 is a flowchart showing the preprocessing according to the main storage residential communication method.

FIG. 26 shows a detailed flow of the pre-processing of the main storage residential communication in the present example. FIG. 20 is a table showing a mapping of data transmission and reception areas (namely, the Top, Bottom, LeftBuf, and RightBuf portions) onto physical pages accomplished through execution of this flow. Since data of a row includes 8192 bytes, the data is partitioned into 4096 first-half bytes and 4096 last-half bytes so as to store each thereof in a page. Physical pages corresponding to the Top, Bottom, LeftBuf, and RightBuf portions are allocated to the page fixing area 1308 of FIG. 4. In this connection, pages of the array Array not explicitly shown in the table of FIG. 20 are allocated to the paging area 1307.

FIG. 9 shows a portion of physical page allocation of the table of FIG. 20. For the Top (receiver), Bottom (receiver), LeftBuf (receiver), and RightBuf (receiver) portions for receiving boundary data from adjacent nodes, two sides of physical pages are assigned so as to conduct a double buffering operation employing two sides including sides A and B. With this provision, while a computation is being achieved on a side, it is possible to receive data from an adjacent node onto the other side.

In addition, as shown in FIG. 9, in the page allocation onto the area 1308, only odd-numbered physical pages are assigned to the user space (i.e. the array Array and the like) without using even-numbered physical pages. According to the allocation of every other physical pages which are odd-numbered physical pages in this embodiment as above, packet headers can be inserted into physical pages existing therebetween which are even-numbered physical pages in this embodiment. With the provision above, without conducting data copy processing or without using any special hardware, a packet header can be added to transmission data in a sender node and the packet header can be deleted from a reception packet in a receiver node.

§5.3 Cross-Cascade Data Streaming

In the main storage residential communication method, there occurs an overwriting operation in which data just being used for computation on a receiver side is destroyed in response to a data transfer from a sender side. As described in Section 2, with incorporation of the double buffering function using the sides A and B into the combuf__write and combuf__watch routines, the overwriting operation may be suppressed to a certain extent. However, also in the method described in Section 2, when two or more combuf__write instructions are successively issued before combuf__watch is issued from the receiver side, the overwriting operation takes place.

Figure 21:
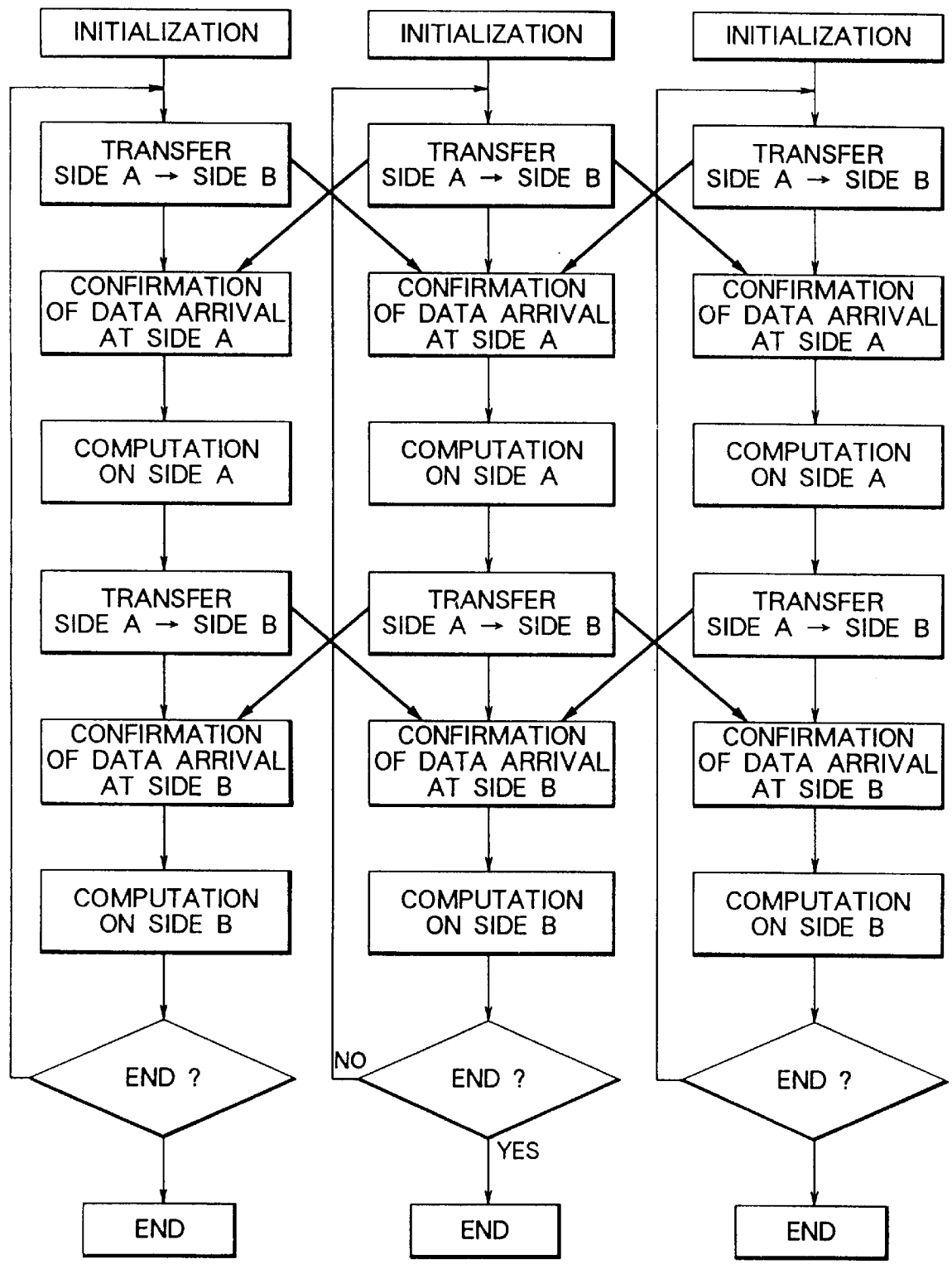
FIG. 21 is a flowchart showing the processing flow of a cross-cascade data streaming (CCDS) method.

This section describes a parallel operation method (cross-cascade data streaming method to be abbreviated as CCDS herebelow) completely suppressing the overwriting operation onto the combuf according to a combination of an operation like a data flow and the double buffering. In this method, computation processing of each node is achieved according to an algorithm of FIG. 21 which is obtained by developing an algorithm of FIG. 15. A central portion of FIG. 21 shows a processing flow of a node. In this diagram, the processing flow of adjacent nodes is also partially drawn. Moreover, an inclined bold line indicates a communication with an adjacent node (only communications in two directions are selected from communications in four directions with adjacent nodes to be shown in this diagram.)

According to this algorithm, the computation processing is subdivided into two phases to conduct a control operation like a data flow control such that a subsequent phase is not initiated until data items are entirely arranged from the adjacent nodes. Furthermore, two physical pages (sides A and B) assigned to the reception combuf are alternately used for each phase to accomplish the computation. Namely, in a phase where the computation is effected with physical pages on the side A, data from adjacent nodes are received in physical pages on the side B.

Figure 27:
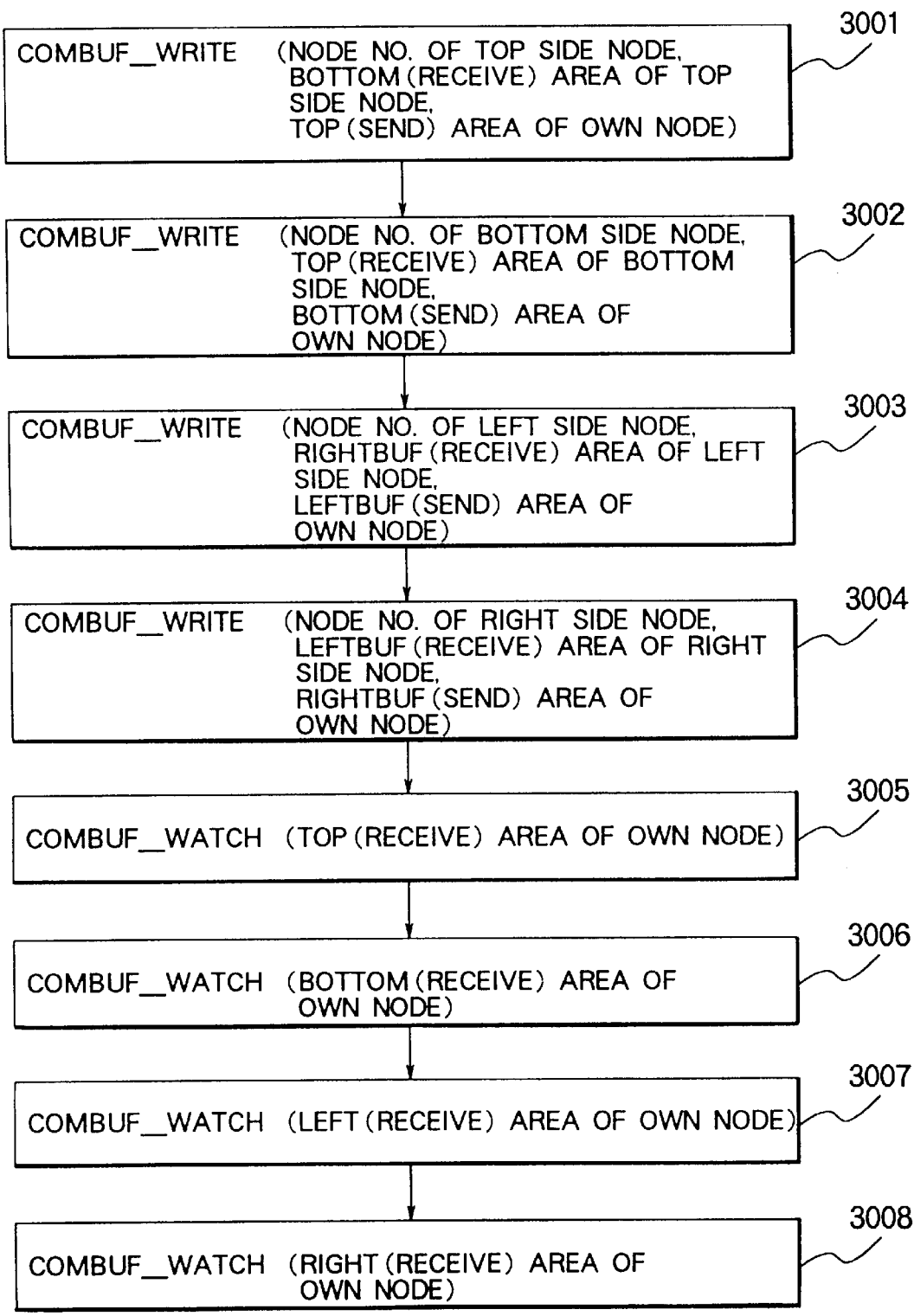
FIG. 27 is a flowchart showing the flow of data exchange processing with adjacent nodes.

FIG. 27 shows details of a procedure to transfer data to adjacent nodes in four directions. After the computation processing is completed in the node, data of the own node is transmitted by combuf__write to the four adjacent nodes in the four directions, namely, Top, Bottom, Left, and Right directions according to the flow of FIG. 27. When the transmission is finished, the node waits by combuf__wait for reception of data from the four-directional adjacent nodes.

In this connection, as described in Section 2, the change-over processing between the buffer sides including the sides A and B is accomplished in the combuf__write and combuf__watch routines. Consequently, the user program need not pay attention to the two phases in the processing 902 as well as the processing 903.

Figure 22:
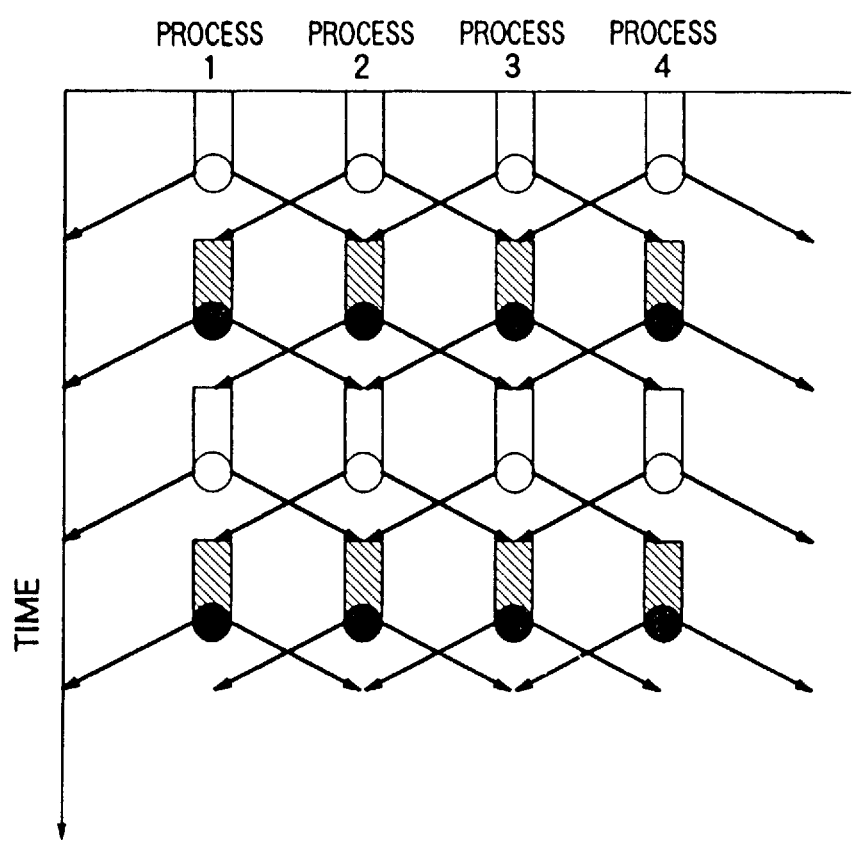
FIG. 22 is a diagram showing a uniform CCDS operation.
Figure 23:
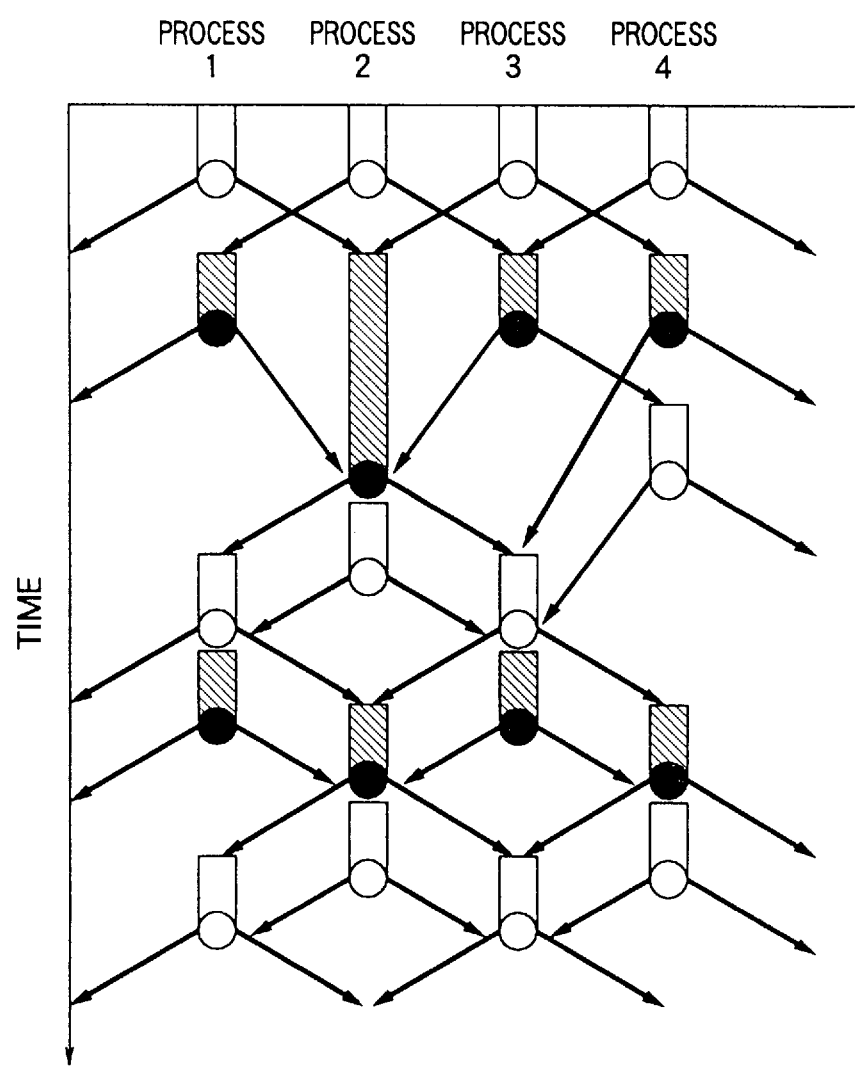
FIG. 23 is a diagram showing a non-uniform CCDS operation.

According to the CCDS method, until data arrives from the adjacent nodes, there does not occur transition of computation on a side to computation on the opposite side, and hence the problem of the overwriting operation due to reception data can be completely avoided. In other words, according to the control of FIG. 21, even when the processing progress becomes to be imbalanced between nodes due to a cause, for example, elongation of computation processing time in a node, there is automatically established synchronization between the node and the adjacent nodes. An adjacent node starts computation on the opposite side only when data is arrived from the node in which the processing time is elongated. FIGS. 22 and 23 show the operation above. In these diagrams, a hatched portion denotes a computation phase using the side A, a white portion designates a computation phase employing the side B, and an arrow mark stands for a data transfer from the side B to the side A or a data transfer from the side a to the side B.

FIG. 22 shows a case where processing is uniformly being executed in all nodes. Even when computation time of the process 2 on the side A is elongated, data sent from the adjacent processes 1 and 3 is written on the side B; consequently, data being subjected to the computation cannot be destroyed. Moreover, the processes 1 and 3 do not initiate computations on the side B until data arrives from the process 2.

As above, since a kind of feedback operation is effected in the CCDS method, there does not occur a case where only a certain node passes another node to proceed to a subsequent computation phase. According to the CCDS method, thanks to the feedback action, synchronization of the overall system can be implemented by a chain action of synchronization between the adjacent nodes even when there is missing a hardware mechanism for the overall synchronization of all nodes.

(Variation)

In this embodiment, data which is added to transfer data and which is to be thus transferred includes a write address of a packet header. However, when the packet header is not related to a page preceding to the page in which transfer data is to be written, an address to which the data is to be transferred need only be used as the data write address. Resultantly, according to the present invention, the receiver side need not achieve any special processing and it is only necessary to transfer an address where reception data can be written.

In addition, according to the embodiment, after the data reception area is set as a resident area in the memory in a receiver node, an address of the area is transferred to the sender node. However, according to this embodiment, in place of the address, an address of a header area reserved at a location preceding the area may be transferred.

Moreover, in place of the method to transfer the address, there may be employed a method in which a reception data area is reserved at a location of a predetermined address such that the address is beforehand memorized in the sender side. Naturally, the method in which, like in the embodiment, each time a reception buffer area is reserved, information related to an address thereof is transferred to the sender node is favorable since restriction of the location where the reception data area is reserved is mitigated.

According to the present invention, various problems of the main storage residential communication method can be removed and quite a high-speed intranode communication can be implemented. Specifically, the following advantageous effect is obtained according to the present invention.

1) Processing to decide an address to write transfer data in a receiver node can be minimized.

2) Suppression of the overwriting operation and implementation of synchronization between sender and receiver processes Thanks to the main storage residential communication method including the double buffering function and the cross-cascade data streaming method, the problem of the overwriting operation onto a reception data area can be solved. Moreover, at the same time, due to operation in which a process of each node mutually transfers data to each other, there can be developed a function to establish synchronization between the sender and receiver processes with a reduced overhead.

3) Data occupying a plurality of pages and headers for transfer thereof can be transferred at a high speed through simple processing.

4) Detection and prevention of invalid data transfer

Prior to an actual data transfer, an access right code for an access to a reception area is notified to the operating system of a sender side and validity of the access right code returned together with transfer data is checked by the receiver side. Consequently, an invalid data transfer due to a program bug or the like can be detected and hence reliability of the system is be improved.

5) Easy programming

In synchronism with data transmission or reception, the reception buffer side is switched by the operating system. Consequently, the double buffering function need not be explicitly described at a level of the user program, thereby facilitating the programming job.

6) Overall synchronization by chain action of partial synchronization

Thanks to the cross-cascade data streaming method, even when there is not adopted a method of an apparatus to establish the overall synchronization in all nodes, it is possible to establish the overall synchronization only according to partial synchronization with adjacent nodes related to data exchange. Implementation of the overall synchronization by the chain action of partial synchronization is quite useful in a distributed system and a large-sized parallel processing system in which it is impossible to easily establish the overall synchronization with a high performance.

While particular embodiments of the invention have been shown and described, it will be obvious to those skilled in the art that various changes and modifications may be made without departing from the present invention in its broader aspects.

We claim:

1. An interprocessor data communication method for use in a distributed memory computer system including a plurality of nodes and a data transfer network connecting the nodes, each node having a processor and a real memory for keeping therein a program which is to be executed by the processor and which uses a virtual memory space and data to be used by the program, comprising the steps of:

allocating, to a virtual reception area a first virtual space used by a data receiver process for receiving data, a real data reception area resident in a real memory on a data receiver side in a data receiver node for executing the data receiver process with the plural nodes;

allocating, to a virtual data transmission area in a second virtual memory space used by a data sender process for transmitting data to the data receiver process, a real data transmission area resident in a real memory on a data sender side in a data sender node for executing the data sender process with the plural nodes;

storing said sender node information related to an address of said real data reception area allocated in said data receiver node;

accessing the virtual data transmission area by the data sender process and writing data to be transferred to the data receiver process in the real data transmission area;

transferring address information which is determined by the stored information and which specifies a write address of the data in the real memory of the data receiver node, from the data sender node to the data receiver node together with the written data;

writing, by the data receiver node, the transferred data in a location specified by the transferred information in the real memory of the data receiver side; and, accessing, by the data receiver process, the virtual data reception area and the written data therefrom.

* * * * *